United States Patent
Clawson

(10) Patent No.: US 8,873,719 B2
(45) Date of Patent: *Oct. 28, 2014

(54) ACTIVE ASSAILANT PROTOCOL FOR EMERGENCY DISPATCH

(71) Applicant: Jeffrey J. Clawson, Salt Lake City, UT (US)

(72) Inventor: Jeffrey J. Clawson, Salt Lake City, UT (US)

(*) Notice: Subject to any disclaimer, the term of this patent is extended or adjusted under 35 U.S.C. 154(b) by 40 days.

This patent is subject to a terminal disclaimer.

(21) Appl. No.: 13/755,793

(22) Filed: Jan. 31, 2013

(65) Prior Publication Data

US 2014/0211927 A1 Jul. 31, 2014

(51) Int. Cl.
*H04M 3/51* (2006.01)

(52) U.S. Cl.
CPC .................... *H04M 3/5116* (2013.01)
USPC ............ 379/45; 379/201.01; 379/201.03; 379/37; 379/42

(58) Field of Classification Search
CPC ... H04M 3/493; H04M 11/04; H04M 3/5116; G06Q 50/26
USPC ............ 379/37–49, 201.01, 201.03; 340/505, 340/539.1, 539.13, 540, 5.61, 825.09
See application file for complete search history.

(56) References Cited

U.S. PATENT DOCUMENTS

| | | | |
|---|---|---|---|
| 3,799,147 A | 3/1974 | Adolph et al. | |
| 4,130,881 A | 12/1978 | Haessler et al. | |
| 4,164,320 A | 8/1979 | Irazoqui et al. | |
| 4,237,344 A | 12/1980 | Moore | |
| 4,290,114 A | 9/1981 | Sinay | |
| 4,338,493 A | 7/1982 | Stenhuis et al. | |
| 4,360,345 A | 11/1982 | Hon | |
| 4,455,548 A | 6/1984 | Burnett | |
| 4,489,387 A | 12/1984 | Lamb et al. | |
| 4,731,725 A | 3/1988 | Suto et al. | |
| 4,839,822 A | 6/1989 | Dormond et al. | |
| 4,858,121 A | 8/1989 | Barber et al. | |

(Continued)

FOREIGN PATENT DOCUMENTS

| CN | 101169840 A | 4/2008 |
|---|---|---|
| CN | 201117055 Y | 9/2008 |

(Continued)

OTHER PUBLICATIONS

Clark University "Active Shooter Emergency Plan" Revised Jan. 11, 2013.*

(Continued)

*Primary Examiner* — Melur Ramakrishnaiah
(74) *Attorney, Agent, or Firm* — John R. Thompson; Stoel Rives LLP

(57) ABSTRACT

Systems and methods are provided to guide an emergency dispatcher in responding to emergency calls involving an active assailant. The systems and methods can include an emergency police dispatch protocol configured to facilitate rapid, uniform, and consistent handling of events involving active assailants. The emergency police dispatch protocol includes one or more dispatch protocols configured for particular incidents or emergency situations, such as to aid the dispatcher in processing calls relating to active assailants. The emergency police dispatch protocol presents a pre-scripted interrogation, including preprogrammed inquiries for a dispatcher to ask the caller. The pre-scripted interrogation of the dispatch protocol facilitates rapid, uniform, and consistent responses to incidents with active assailants. The dispatch protocol may facilitate deployment of responders as quickly as possible to active assailant events and update responders with information as it is gathered.

20 Claims, 15 Drawing Sheets

(56) References Cited

U.S. PATENT DOCUMENTS

| | | |
|---|---|---|
| 4,865,549 A | 9/1989 | Sonsteby |
| 4,922,514 A | 5/1990 | Bergeron et al. |
| 4,926,495 A | 5/1990 | Comroe et al. |
| 4,945,476 A | 7/1990 | Bodick et al. |
| 4,967,754 A | 11/1990 | Rossi |
| 5,063,522 A | 11/1991 | Winters |
| 5,065,315 A | 11/1991 | Garcia |
| 5,072,383 A | 12/1991 | Brimm et al. |
| 5,077,666 A | 12/1991 | Brimm et al. |
| 5,086,391 A | 2/1992 | Chambers |
| 5,109,399 A | 4/1992 | Thompson |
| 5,122,959 A | 6/1992 | Nathanson et al. |
| 5,193,855 A | 3/1993 | Shamos |
| 5,228,449 A | 7/1993 | Christ et al. |
| 5,253,164 A | 10/1993 | Holloway et al. |
| 5,255,187 A | 10/1993 | Sorensen |
| 5,291,399 A | 3/1994 | Chaco |
| 5,323,444 A | 6/1994 | Ertz et al. |
| 5,339,351 A | 8/1994 | Hoskinson et al. |
| 5,348,008 A | 9/1994 | Bornn et al. |
| 5,379,337 A | 1/1995 | Castillo et al. |
| 5,404,292 A | 4/1995 | Hendrickson |
| 5,410,471 A | 4/1995 | Alyfuku et al. |
| 5,423,061 A | 6/1995 | Fumarolo et al. |
| 5,438,996 A | 8/1995 | Kemper et al. |
| 5,441,047 A | 8/1995 | David et al. |
| 5,462,051 A | 10/1995 | Oka et al. |
| 5,471,382 A | 11/1995 | Tallman et al. |
| 5,502,726 A | 3/1996 | Fischer |
| 5,513,993 A | 5/1996 | Lindley et al. |
| 5,516,702 A | 5/1996 | Senyei et al. |
| 5,521,812 A | 5/1996 | Feder et al. |
| 5,536,084 A | 7/1996 | Curtis et al. |
| 5,544,649 A | 8/1996 | David et al. |
| 5,554,031 A | 9/1996 | Moir et al. |
| 5,590,269 A | 12/1996 | Kruse et al. |
| 5,594,638 A | 1/1997 | Iliff |
| 5,594,786 A | 1/1997 | Chaco et al. |
| 5,596,994 A | 1/1997 | Bro |
| 5,630,125 A | 5/1997 | Zellweger |
| 5,636,873 A | 6/1997 | Sonsteby |
| 5,650,995 A | 7/1997 | Kent |
| 5,660,176 A | 8/1997 | Iliff |
| 5,675,372 A | 10/1997 | Aguayo, Jr. et al. |
| 5,682,419 A | 10/1997 | Grube et al. |
| 5,684,860 A | 11/1997 | Milani et al. |
| 5,689,229 A | 11/1997 | Chaco et al. |
| 5,719,918 A | 2/1998 | Serbetciouglu et al. |
| 5,722,418 A | 3/1998 | Bro |
| 5,724,983 A | 3/1998 | Selker et al. |
| 5,734,706 A | 3/1998 | Windsor et al. |
| 5,745,532 A | 4/1998 | Campana, Jr. |
| 5,748,907 A | 5/1998 | Crane |
| 5,754,960 A | 5/1998 | Downs et al. |
| 5,759,044 A | 6/1998 | Redmond |
| 5,761,278 A | 6/1998 | Pickett et al. |
| 5,761,493 A | 6/1998 | Blakeley et al. |
| 5,787,429 A | 7/1998 | Nikolin, Jr. |
| 5,805,670 A | 9/1998 | Pons et al. |
| 5,809,493 A | 9/1998 | Ahamed et al. |
| 5,822,544 A | 10/1998 | Chaco et al. |
| 5,823,948 A | 10/1998 | Ross, Jr. et al. |
| 5,826,077 A | 10/1998 | Blakeley et al. |
| 5,832,187 A | 11/1998 | Pedersen et al. |
| 5,842,173 A | 11/1998 | Strum et al. |
| 5,844,817 A | 12/1998 | Lobley et al. |
| 5,850,611 A | 12/1998 | Krebs |
| 5,857,966 A | 1/1999 | Clawson |
| 5,901,214 A | 5/1999 | Shaffer et al. |
| 5,902,234 A | 5/1999 | Webb |
| 5,910,987 A | 6/1999 | Ginter et al. |
| 5,912,818 A | 6/1999 | McGrady et al. |
| 5,915,019 A | 6/1999 | Ginter et al. |
| 5,926,526 A | 7/1999 | Rapaport et al. |
| 5,933,780 A | 8/1999 | Connor et al. |
| 5,961,446 A | 10/1999 | Beller et al. |
| 5,962,891 A | 10/1999 | Arai |
| 5,964,700 A | 10/1999 | Tallman et al. |
| 5,986,543 A | 11/1999 | Johnson |
| 5,989,187 A | 11/1999 | Clawson |
| 5,991,730 A | 11/1999 | Lubin et al. |
| 5,991,751 A | 11/1999 | Rivette et al. |
| 6,004,266 A | 12/1999 | Clawson |
| 6,010,451 A | 1/2000 | Clawson |
| 6,022,315 A | 2/2000 | Iliff |
| 6,035,187 A | 3/2000 | Franza |
| 6,040,770 A | 3/2000 | Britton |
| 6,052,574 A | 4/2000 | Smith, Jr. |
| 6,053,864 A | 4/2000 | Clawson |
| 6,058,179 A | 5/2000 | Shaffer et al. |
| 6,074,345 A | 6/2000 | van Oostrom et al. |
| 6,076,065 A | 6/2000 | Clawson |
| 6,078,894 A | 6/2000 | Clawson et al. |
| 6,106,459 A | 8/2000 | Clawson |
| 6,112,083 A | 8/2000 | Sweet et al. |
| 6,115,646 A | 9/2000 | Fiszman et al. |
| 6,117,073 A | 9/2000 | Jones et al. |
| 6,118,866 A | 9/2000 | Shtivelman |
| 6,127,975 A | 10/2000 | Maloney |
| 6,134,105 A | 10/2000 | Lueker |
| 6,292,542 B1 | 9/2001 | Bilder |
| 6,370,234 B1 | 4/2002 | Kroll |
| 6,535,121 B2 | 3/2003 | Matheny |
| 6,594,634 B1 | 7/2003 | Hampton et al. |
| 6,607,481 B1 | 8/2003 | Clawson |
| 6,610,012 B2 | 8/2003 | Mault |
| 6,696,956 B1 | 2/2004 | Uchida et al. |
| 6,879,819 B2 | 4/2005 | Brooks |
| 6,901,397 B1 | 5/2005 | Moldenhauer et al. |
| 6,931,112 B1 | 8/2005 | McFarland et al. |
| 6,968,375 B1 | 11/2005 | Brown |
| 7,106,835 B2 | 9/2006 | Saalsaa |
| 7,194,395 B2 | 3/2007 | Genovese |
| 7,289,944 B1 | 10/2007 | Genovese |
| 7,428,301 B1 | 9/2008 | Clawson |
| 7,436,937 B2 | 10/2008 | Clawson |
| 7,645,234 B2 | 1/2010 | Clawson |
| 7,703,020 B2 | 4/2010 | Bhattaru |
| 7,783,586 B2 | 8/2010 | Friedlander et al. |
| 7,978,826 B2 | 7/2011 | Salafia et al. |
| 8,066,638 B2 | 11/2011 | Clawson |
| 8,103,523 B2 | 1/2012 | Clawson |
| 8,294,570 B2 | 10/2012 | Clawson |
| 8,335,298 B2 | 12/2012 | Clawson |
| 8,346,942 B2 | 1/2013 | Ezerzer et al. |
| 8,355,483 B2 | 1/2013 | Clawson |
| 8,396,191 B2 | 3/2013 | Clawson |
| 8,417,533 B2 | 4/2013 | Clawson |
| 8,488,748 B2 | 7/2013 | Clawson |
| 8,494,868 B2 | 7/2013 | Saalsaa |
| 8,670,526 B2 | 3/2014 | Clawson |
| 8,712,020 B2 | 4/2014 | Clawson |
| 2002/0004729 A1 | 1/2002 | Zak et al. |
| 2002/0106059 A1 | 8/2002 | Kroll et al. |
| 2003/0028536 A1 | 2/2003 | Singh et al. |
| 2003/0050538 A1 | 3/2003 | Naghavi et al. |
| 2003/0187615 A1 | 10/2003 | Epler |
| 2003/0195394 A1 | 10/2003 | Saalsaa |
| 2003/0212575 A1 | 11/2003 | Saalsaa et al. |
| 2005/0015115 A1 | 1/2005 | Sullivan et al. |
| 2006/0059423 A1 | 3/2006 | Lehmann et al. |
| 2006/0122520 A1 | 6/2006 | Banet et al. |
| 2006/0167346 A1 | 7/2006 | Sarel |
| 2006/0173500 A1 | 8/2006 | Walker et al. |
| 2006/0178908 A1 | 8/2006 | Rappaport |
| 2006/0212315 A1 | 9/2006 | Wiggins |
| 2006/0225213 A1 | 10/2006 | Tomcany |
| 2007/0055559 A1 | 3/2007 | Clawson |
| 2007/0112275 A1 | 5/2007 | Cooke et al. |
| 2007/0116189 A1 | 5/2007 | Clawson |
| 2007/0189480 A1* | 8/2007 | Salafia et al. ............ 379/142.01 |
| 2007/0201664 A1 | 8/2007 | Salafia et al. |
| 2008/0208801 A1 | 8/2008 | Friedlander et al. |
| 2008/0310600 A1 | 12/2008 | Clawson |

(56) References Cited

U.S. PATENT DOCUMENTS

| | | |
|---|---|---|
| 2009/0037374 A1 | 2/2009 | Delia et al. |
| 2009/0168975 A1 | 7/2009 | Clawson |
| 2009/0191529 A1 | 7/2009 | Mozingo et al. |
| 2010/0004710 A1 | 1/2010 | Kellum |
| 2010/0121156 A1 | 5/2010 | Yoo |
| 2010/0152800 A1 | 6/2010 | Walker et al. |
| 2010/0198755 A1 | 8/2010 | Soll et al. |
| 2010/0257250 A1 | 10/2010 | Salafia et al. |
| 2011/0050417 A1 | 3/2011 | Piccioni |
| 2011/0064204 A1 | 3/2011 | Clawson |
| 2011/0066002 A1 | 3/2011 | Clawson |
| 2011/0099031 A1 | 4/2011 | Nair |
| 2011/0205052 A1 | 8/2011 | Clawson |
| 2011/0215930 A1 | 9/2011 | Lee |
| 2012/0066345 A1 | 3/2012 | Rayan et al. |
| 2012/0171989 A1 | 7/2012 | Matsuo et al. |
| 2012/0183128 A1 | 7/2012 | Clawson |
| 2012/0207286 A1 | 8/2012 | Clawson |
| 2012/0210271 A1 | 8/2012 | Clawson |

FOREIGN PATENT DOCUMENTS

| | | |
|---|---|---|
| GB | 2471960 | 1/2011 |
| GB | 2478171 A | 8/2011 |
| GB | 2482741 A | 2/2012 |
| GB | 2489875 A | 10/2012 |
| JP | 2002-049693 | 2/2002 |
| JP | 2003-109162 A | 4/2003 |
| JP | 2003-187003 A | 7/2003 |
| JP | 2003-256963 A | 12/2003 |
| JP | 2010-033201 A | 12/2010 |
| KR | 10-2005-0085778 | 8/2005 |
| KR | 10-2006-0084866 | 7/2006 |
| KR | 2007-0043337 A | 4/2007 |
| KR | 10-2008-0004125 | 1/2008 |
| KR | 10-2009-0014837 A | 2/2009 |
| WO | WO2004/030259 | 4/2004 |
| WO | WO2006/015229 A2 | 2/2006 |
| WO | WO 2008/014398 A2 | 1/2008 |
| WO | WO2008/156876 A1 | 12/2008 |
| WO | WO 2011031383 | 3/2011 |
| WO | WO 2012/108898 A1 | 8/2012 |

OTHER PUBLICATIONS

Radosevich, Lynda, "Network holds sway on life, death," Computerworld, v27 n21, May 24, 1993, 2 pgs.

Harris, Roger, "Updated 911 Phone System Top Concern of Residents," Business First-Louisville, v9 n19 s1, Dec. 1992, 3 pgs.

"Geac Completes Software Install," Wireless Week, Nov. 18, 1996, 3 pgs.

"Dictaphone introduces Windows-based Computer-Aided Dispatch (CAD) system," Business Wire, Apr. 23, 1996, 2 pgs. (in commercial use in 1995).

Holroyd, Brian, et al., "Medical Control; Quality Assurance in Prehospital Care," JAMA, the Journal of American Medical Association, v256, n8, Aug. 1986, p. 1027-1031.

CBS web page News Story entitled "911 Operator: 'It's got to be Hell'", Mar. 31, 2006 (excerpts from 911 operators' actions during the attacks on Sep. 11, 2001), 3 pgs.

Best, Wendy, "999 United Emergency services share life-saving Role to boost response," Western Daily Press, WDP Severnside ed., May 27, 1999, 2 pgs.

Poellmitz, William C., "Wireless technology keeps public safety a step ahead," Nation's Cities Weekly, v21 n17, Apr. 27, 1998, 3 pgs.

Crowley, Mark, "Learning from CAD System Implementation," Communications, v29 n8, Aug. 1992, 5 pgs.

Anonymous, "Suburban Chicago towns centralize 911 services," Communications News, v31 n10, Oct. 1994, 2 pgs.

Office Action Summary from USPTO for U.S. Appl. No. 10/255,901 mailed Dec. 31, 2003, 8 pgs.

Office Action Summary from USPTO for U.S. Appl. No. 10/255,901 mailed Oct. 13, 2004, 8 pgs.

Office Action Summary from USPTO for U.S. Appl. No. 10/255,901 mailed Jun. 29, 2005, 7 pgs.

Advisory Action Before the Filing of an Appeal Brief from USPTO for U.S. Appl. No. 10/255,901 mailed Feb. 14, 2006, 3 pgs.

Office Action Summary from USPTO for U.S. Appl. No. 10/255,901 mailed Jun. 7, 2006, 8 pgs.

Office Action Summary from USPTO for U.S. Appl. No. 10/255,901 mailed Feb. 27, 2007, 8 pgs.

Office Action Summary from USPTO for U.S. Appl. No. 10/255,901 mailed Sep. 6, 2007, 9 pgs.

Office Action Summary from USPTO for U.S. Appl. No. 10/255,905 mailed May 19, 2004, 7 pgs.

Office Action Summary from USPTO for U.S. Appl. No. 10/255,905 mailed May 26, 2005, 5 pgs.

Office Action Summary from USPTO for U.S. Appl. No. 10/255,905 mailed Feb. 9, 2006, 8 pgs.

Advisory Action Before the Filing of an Appeal Brief from USPTO for U.S. Appl. No. 10/255,905 mailed Aug. 11, 2006, 3 pgs.

Office Action Summary from USPTO for U.S. Appl. No. 10/255,905 mailed Jan. 30, 2007, 7 pgs.

Notice of Non-Compliant Amendment (37 CFR 1.121) from USPTO for U.S. Appl. No. 10/255,905 mailed Jul. 9, 2007, 4 pgs.

Office Action Summary from USPTO for U.S. Appl. No. 10/255,905 mailed Oct. 5, 2007, 7 pgs.

Office Action Summary from USPTO for U.S. Appl. No. 09/685,697 mailed Jul. 18, 2003, 8 pgs.

Office Action Summary from USPTO for U.S. Appl. No. 09/685,697 mailed Feb. 3, 2004, 5 pgs.

Office Action Summary from USPTO for U.S. Appl. No. 09/685,697 mailed Jan. 4, 2005, 5 pgs.

Office Action Summary from USPTO for U.S. Appl. No. 09/685,697 mailed Oct. 4, 2005, 7 pgs.

Advisory Action Before the Filing of an Appeal Brief from USPTO for U.S. Appl. No. 09/685,697 mailed Mar. 13, 2006, 4 pgs.

Office Action Summary from USPTO for U.S. Appl. No. 09/685,697 mailed Jun. 26, 2006, 8 pgs.

Office Action Summary from USPTO for U.S. Appl. No. 09/685,697 mailed Apr. 10, 2007, 9 pgs.

Office Action Summary from USPTO for U.S. Appl. No. 09/685,697 mailed Oct. 9, 2007, 11 pgs.

Office Action Summary from USPTO for U.S. Appl. No. 10/140,635 mailed Oct. 3, 2003, 9 pgs.

Office Action Summary from USPTO for U.S. Appl. No. 10/140,635 mailed Jul. 16, 2004, 11 pgs.

Office Action Summary from USPTO for U.S. Appl. No. 10/140,635 mailed Apr. 19, 2005, 11 pgs.

Office Action Summary from USPTO for U.S. Appl. No. 10/140,635 mailed Jan. 17, 2006, 13 pgs.

Office Action Summary from USPTO for U.S. Appl. No. 10/140,635 mailed Sep. 20, 2006, 15 pgs.

Office Action Summary from USPTO for U.S. Appl. No. 10/140,635 mailed Jun. 21, 2007, 15 pgs.

International Search Report for PCT/US2008/054987 filed on Feb. 26, 2008, and mailed on Oct. 8, 2008, 2 pgs.

Written Opinion of the International Searching Authority for PCT/US2008/054987 filed on Feb. 26, 2008, and mailed on Oct. 8, 2008, 9 pgs.

Notification of Transmittal of the International Search Report (2 pgs.) for PCT/US2009/040909, International Search Report, (2 pgs.), and Written Opinion (8 pgs.) mailed from International Searching Authority on Jun. 10, 2009.

International Search Report and Written Opinion for PCT/US09/48577, International filing date Jun. 25, 2009, mailed from ISA Aug. 7, 2009, 9 pgs.

International Search Report and Written Opinion mailed Jan. 19, 2011 in PCT Application No. PCT/US2010/043308, filed Jul. 27, 2010.

International Search Report and Written Opinion mailed Jan. 19, 2011 in PCT Application No. PCT/US2010/043311, filed Jul. 27, 2010.

(56) References Cited

OTHER PUBLICATIONS

Office Action Summary from USPTO for U.S. Appl. No. 12/396,201 mailed Mar. 8, 2011, 23 pgs.
International Search Report and Written Opinion PCT/US2010/050402, filed on Sep. 27, 2010, and mailed from ISA on Apr. 27, 2011, 9 pgs.
Office Action Summary from USPTO for U.S. Appl. No. 12/268,963 mailed Jul. 29, 2011, 18 pgs.
International Preliminary Report of Patentability for PCT/US2009/048577 filed on Jun. 25, 2009 mailed Oct. 27, 2011, 7 pgs.
International Search Report and Written Opinion for PCT/US2011/042543 filed on Jun. 30, 2011, mailed from ISA on Feb. 9, 2012, 11 pgs.
International Search Report and Written Opinion for PCT/US2011/042582 filed on Jun. 30, 2011, mailed from ISA on Feb. 9, 2012, 8 pgs.
International Preliminary Report of Patentability for PCT/US2010/043308 filed on Jul. 27, 2010 mailed Mar. 22, 2012, 6 pgs.
International Preliminary Report of Patentability for PCT/US2010/043311 filed on Jul. 27, 2010 mailed Mar. 29, 2012, 6 pgs.
Office Action Summary from USPTO for U.S. Appl. No. 12/558,045 mailed Mar. 22, 2012, 9 pgs.
Office Action Summary from USPTO for U.S. Appl. No. 12/558,808 mailed Apr. 23, 2012, 9 pgs.
Office Action Summary from USPTO for U.S. Appl. No. 12/422,561 mailed Jul. 3, 2012, 21 pgs.
International Search Report and Written Opinion for PCT/US2012/021867 filed on Jan. 19, 2012, and mailed from ISA on Aug. 30, 2012, 8 pgs.
Office Action Summary from USPTO for U.S. Appl. No. 13/354,116 mailed Jan. 22, 2013, 9 pgs.
Office Action Summary from USPTO for U.S. Appl. No. 12/422,561 mailed Feb. 1, 2013, 26 pgs.
Notice of Allowance from USPTO for U.S. Appl. No. 13/026,055 mailed Jan. 24, 2013.
Notice of Allowance from USPTO for U.S. Appl. No. 10/255,901 mailed Feb. 20, 2013.
Nordberg, Marie, "Dispatch Disasters," Emergency Medicine, Aug. 1995.
Liferidge, Aisha T., et al., "Ability of Laypersons to Use the Cincinnati Prehospital Stroke Scale", Prehospital Emergency Care, Elsevier, vol. 8, No. 4, Oct. 1, 2004, pp. 384-387.
Office Action Summary from USPTO for U.S. Appl. No. 13/026,043 mailed Oct. 10, 2013.
Notice of Allowance from USPTO for U.S. Appl. No. 13/354,116 mailed Jun. 7, 2013.
International Preliminary Report of Patentability for PCT/US2011/042543 filed on Jun. 30, 2011 mailed Aug. 22, 2013, 7 pgs.
International Preliminary Report of Patentability for PCT/US2011/042582 filed on Jun. 30, 2011 mailed Aug. 22, 2013, 5 pgs.
Office Action Summary from USPTO for U.S. Appl. No. 13/605,501 mailed Nov. 18, 2013.
International Search Report and Written Opinion for PCT/US2013/055537 filed on Aug. 19, 2013 and mailed from ISA on Nov. 22, 2013.
Notice of Allowance from USPTO for U.S. Appl. No. 13/026,043 mailed Jan. 13, 2014.
Nor, A. Mohd, et al., "Agreement Between Ambulance Paramedic- and Physician-Recorded Neurological Signs With Face Arm Speech Test (FAST) in Acute Stroke Patients", http://stroke.ahajournals.org/content/35/6/1355, Apr. 29, 2004, visited Nov. 17, 2013, 3 pgs.
Notice of Allowance from USPTO for U.S. Appl. No. 13/605,501 mailed Mar. 6, 2014.
International Search Report and Written Opinion for PCT/US2014/011405 filed on Jan. 14, 2014 and mailed from ISA on Apr. 25, 2014.
International Search Report and Written Opinion for PCT/US2014/014029 filed on Jan. 31, 2014 and mailed from ISA on May 16, 2014.

* cited by examiner

*— 300*

```
Paramount for Police                                            _ □ ×
File  View  Spec Logs  Options  Tabs  Version  About ProQA
[icons toolbar]

11:35  8:20      136: Active Assailant (Shooter)         136-E-1G

Entry    |    KQ    |   PDI/CEI   |   DLS   |   Summary
S-1 Evacuation                                    — 310d
Get out of the building/area even if others won't follow. Help others escape, if possible.

Take an evacuation path that's away from the suspect.

Warn others of the situation as you escape.

Do not attempt to move wounded people.

Do not rush towards officers, keep your hands visible at all times, and follow all of their commands.

Update police with the suspect's description and location.

| Main | Additional Information | Special Information |
Can you take the phone with you?
  ⊙ |    ⊕ Yes - Return to KQs     |        No
                    — 605a                    — 605b O: NAE   You are responding to a Active Assailant (Shooter). Code: 136-E-1G:
              C: NAE   ACTIVE ASSAILANT (SHOOTER) (GUN)
              P: STD
                      John Doe, 175 Olive Berry Lane, 801-555-5555
```

630a (label for main panel)
604 (label for lower panel)

FIG. 6B

ACTIVE ASSAILANT PROTOCOL FOR EMERGENCY DISPATCH

COPYRIGHT NOTICE

© 2013 Priority Dispatch Corp. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to computer systems and methods for providing emergency protocol interrogation, instruction, and dispatch. More specifically, the disclosure is directed to computer-implemented protocols to enable a dispatcher to process emergency calls in an accurate, consistent, and systematic manner by guiding the dispatcher during interrogation and instruction of an emergency caller.

BRIEF DESCRIPTION OF THE DRAWINGS

Non-limiting and non-exhaustive embodiments of the disclosure are described, including various embodiments of the disclosure with reference to the figures, in which:

FIGS. 6A-6E are a user interface of an emergency police dispatch system, at various points, as the emergency police dispatch system traverses a logic tree of an active assailant protocol for an emergency dispatch system.

DETAILED DESCRIPTION

Figure 1:
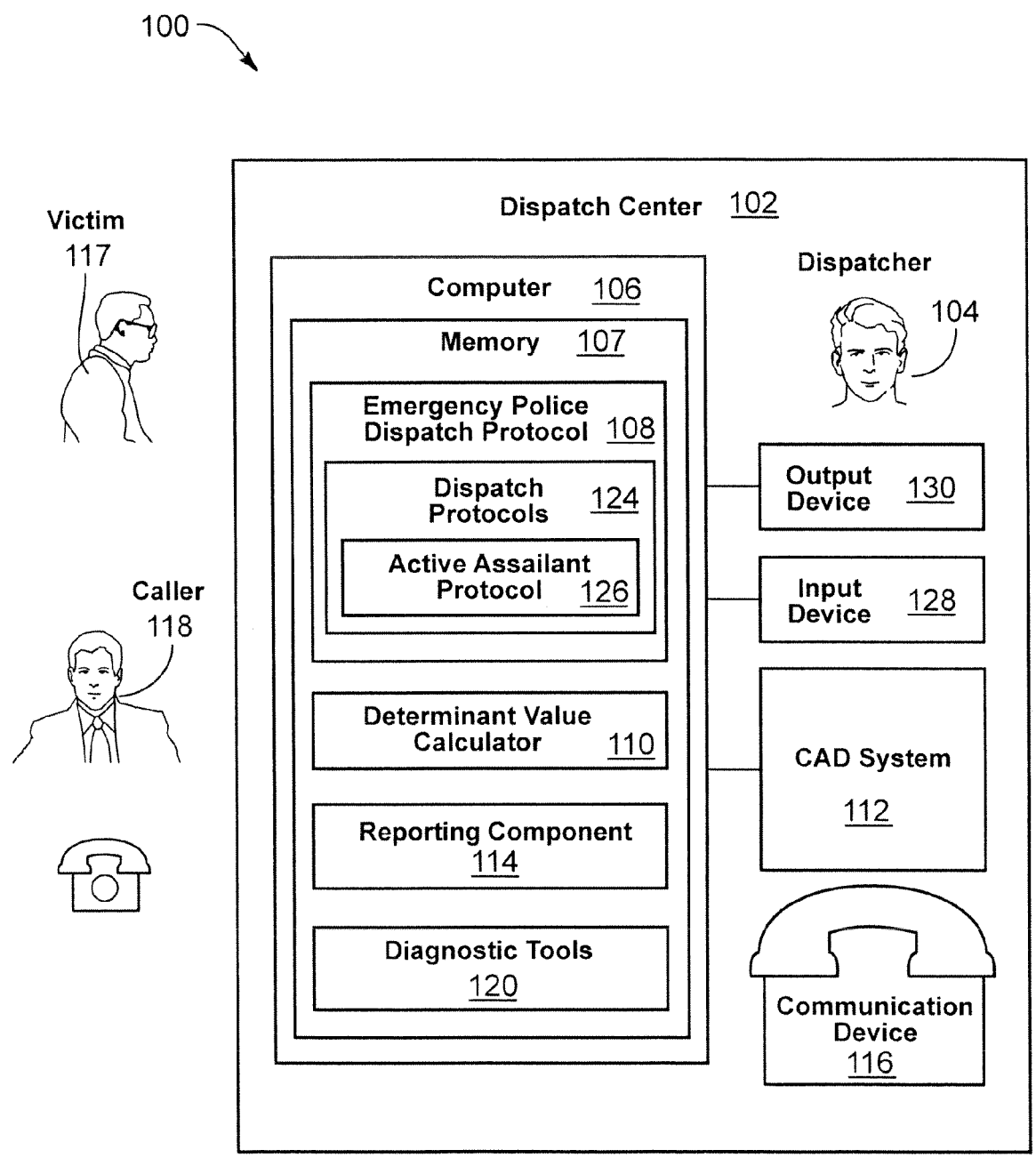
FIG. 1 is a block diagram of an emergency police dispatch system, according to one embodiment.

When a person intends to use or has used any type of weapon to inflict deadly physical force on others, the person may be referred to as an armed assailant. If an armed assailant continues or intends to continue inflicting deadly physical force while having unrestricted access to additional victims, the armed assailant may be referred to as an active assailant and/or an active shooter. An active assailant may be a shooter and/or may use any of a plurality of weapons, such as explosives, a knife, a blunt object, multiple weapons, or the like.

Active assailant events can quickly overwhelm the capabilities of emergency service agencies. Calls to emergency dispatchers can overload the number of phone lines available to an emergency dispatch center. Victims can outnumber available paramedic crews and emergency room beds. The size and scale of the event can easily exhaust available police resources. An event at a large public space or school can clog streets with anxious family members and/or parents. The clogged streets may make the response of additional units or the transport of the injured impossible. Accordingly, it can be important for emergency dispatchers to properly respond to calls reporting an active assailant event to minimize harm to callers and potential victims.

The goal of an active assailant may be to inflict as much death and misery as possible before police intervention. The active assailant may target large common areas where numerous potential victims may congregate, such as cafeterias. Historically, many active assailants have found most of their victims in the open or hiding in plain sight under desks or in corners. Active assailants may not spend much time trying to force entry into closed or locked rooms or offices, because attempting forced entry may slow them down, which is contrary to the goal of inflicting a high body count. Although the active assailant may have one or more specific targets, the active assailant may kill and/or injure anyone in their vicinity while locating a more specific target.

Traditionally, police responded to active assailants by surrounding and containing the scene before waiting for specialized units, such as SWAT teams, to arrive and take over. However, the active assailant may continue to inflict harm during the delay before the specialized units arrive. It may be more effective for police to respond by deploying patrol officers rapidly to the scene. The responders may attempt to locate the active assailant as quickly as possible and contain or neutralize the active assailant. The responders may deploy in teams of two to four officers. The responders may move quickly towards any evidence of the current location of the active assailant, such as the sound of gunfire. If no such evidence is present, they may move more slowly, clear rooms, and be attentive for any evidence and/or sounds indicative of the active assailant's location.

Active assailant incidents may be over in a matter of minutes. The short time frame may place police officers in a difficult position regarding officer and citizen safety and place emergency dispatchers in a critical role. Emergency dispatchers may be the first and/or only persons to interface with potential victims during an active assailant event. In their role of receiving emergency calls, emergency dispatchers are in a unique position and may potentially contribute to more positive outcomes by providing callers with critical lifesaving instructions and by conducting a precise caller interrogation to gather specific information that will assist police officers in determining the appropriate deployment tactics. Unfortunately, often emergency dispatchers are inexperienced and unskilled, largely due to a high turnover rate among emergency dispatchers.

An automated emergency dispatch system, potentially implemented on a computer, can aid even an unskilled and inexperienced dispatcher in prioritizing emergency calls that are received and in processing the calls to generate an appropriate emergency dispatch response. Regardless of the experience or skill level of the dispatcher, the automated emergency dispatch system can enable a consistent and predictable emergency dispatch response, despite the diverse aspects of emergency situations that may be reported from one call to the next.

Although existing automated emergency dispatch systems can enable receiving and processing of widely divergent aspects of emergency situations, these systems may not be well suited for processing particular types of unique situations. More particularly, an automated emergency dispatch system may not be well suited to respond to the short time frames of active assailant events, provide the information needed by first-responding patrol officers, and/or provide effective instructions to callers. An active assailant event may require special processing to enable the quick response time and to provide the particular caller advice necessary. Additional interrogation and instructions and/or alternative emergency dispatch procedures or protocols may facilitate more positive results from active assailant events.

Existing automated emergency dispatch systems are not equipped to assist or enable a dispatcher to process an emergency call involving an active assailant. A dispatcher unfamiliar with active assailant events and/or untrained in handling the same may not be able to compensate for the shortcomings of an automated emergency dispatch system. Inexperienced and/or unskilled dispatchers are generally unable to initiate or assist a proper police response, nor provide effective advice to callers. Even highly skilled and experienced dispatchers may have little skill or experience with handling incidents involving active assailants, simply because such incidents may be relatively rare compared to other types of incidents that are reported. Accordingly, the present disclosure provides a method and system for processing of emergency calls involving active assailant events in a rapid, consistent, and predictable manner.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer-executable code located within a memory device and/or computer-readable storage medium. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory storage device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

An emergency dispatch system as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems. The memory may also store application programs including a Computer Aided Dispatch (CAD) program, an automated emergency dispatch protocol, and a user interface program. The memory may also include data storage. The computer may further include an output device, such as a display unit, for viewing the displayed instructions and inquiries and a user input device for inputting response data.

FIG. 1 is an emergency police dispatch system 100, according to one embodiment. At a dispatch center 102, a dispatcher 104 may operate a computer 106 or other computing device. The computer 106 may include a memory 107 to store protocols, modules, tools, data, etc. The computer 106 may be configured to follow an emergency police dispatch protocol 108 to enable the dispatcher 104 to rapidly and consistently address an emergency incident involving a crime, or otherwise requesting law enforcement, as reported by a caller 118. An emergency call requesting law enforcement may report an incident that may involve a victim 117. As can be appreciated, in some circumstances and/or incidents, the caller 118 is the victim 117. In other instances the caller may be a 2nd party (e.g., a person with the victim 117), 3rd party (e.g., a person not in the immediate vicinity of the victim), 4th party (e.g., a reporting or referral agency), or the suspect (or perpetrator). The emergency police dispatch protocol 108 may include a logic tree, preprogrammed inquiries or questions, possible responses from a caller 118 to the inquiries, and instructions to the caller 118. The responses may route to subsequent preprogrammed inquiries and/or instructions to the caller 118. The emergency police dispatch protocol 108 may also include dispatch protocols 124 for guiding the dispatcher 104 in processing emergency calls involving specific situations and/or incidents. The dispatch protocols 124 may similarly include a logic tree, preprogrammed inquiries or questions, possible responses from a caller 118 to the preprogrammed inquiries, and instructions for the caller 118. The dispatch protocols 124 may include an active assailant protocol 126 for rapid, consistent, and predictable processing of emergency calls involving active assailants.

The responses of the caller 118 are processed according to predetermined logic of the logic tree of the emergency police dispatch protocol 108. The predetermined logic may enable the emergency police dispatch system 100 to provide to the dispatcher 104 information concerning the correct emergency police dispatch response (e.g., by trained law enforcement officers or agencies and/or other emergency responders). The predetermined logic may also enable the emergency police dispatch system 100 to provide to the dispatcher 104 appropriate post-dispatch instructions for relay to the caller 118 before professional help arrives at the scene. The predetermined logic may also enable the emergency police dispatch system 100 to aid the dispatcher in determining an appropriate priority of the emergency call, including but not limited to a priority of the emergency call relative to other emergency calls and a level of emergency response to provide for the reported incident or situation.

Although an emergency police dispatch system 100 is disclosed and described herein, a person of ordinary skill can appreciate that other emergency dispatch systems and protocols are contemplated, including but not limited to emergency medical dispatch systems and protocols and emergency fire dispatch systems and protocols. Exemplary embodiments of emergency dispatch systems and protocols are disclosed in U.S. Pat. Nos. 5,857,966; 5,989,187; 6,004,266; 6,010,451; 6,053,864; 6,076,065; 6,078,894; 6,106,459; 6,607,481; 7,106,835; 7,428,301; 7,436,937; 7,645,234; 8,066,638; 8,103,523; 8,294,570; 8,335,298; and 8,355,483, which are hereby incorporated herein by reference.

The computer 106 operates a determinant value calculator 110 to calculate a determinant value from the responses of the caller 118 to protocol questions. The determinant value may be selected from a group of pre-established determinant values, such that the emergency responders are familiar with the determinant values and understand the meaning of each and what would be a corresponding emergency response. For example, the determinant values may range, for example, from E-1 for generally very serious emergencies to Ω-2 for generally less serious emergencies. The determinant value may provide a categorization code of the type and level of the incident.

In one embodiment of the present disclosure, the determinant value is a combination of a determinant level (Alpha A, Bravo B, Charlie C, Delta D, Echo E and Omega Ω) and a numeric value. Generally, Ω-2 is the least serious while E-1 is the most serious call. Depending on the determinant level, the appropriate emergency response is dispatched as indicated by the response protocol. For example, an Alpha-A call will typically be responded to by a next available law enforcement unit using the safest arrival method reasonably possible. A Delta-D call will typically be responded to by any or all available law enforcement units proceeding under the most urgent method possible. Echo-E calls typically involve likely immediate life-threatening situations and will be responded to in the most urgent manner available. Bravo-B and Charlie-C calls are intermediate calls that are typically responded to in business-like, orderly manner according to specific department protocol. An Omega-Ω call is generally not specifically responded to, but rather is referred to another person or agency. For the purposes of this disclosure, Echo-E is generally abbreviated as E; Delta-D is generally abbreviated as D; Charlie-C is generally abbreviated as C; Bravo-B is generally abbreviated as B; Alpha-A is generally abbreviated as A; and Omega-Ω is generally abbreviated as Ω. Generally, the lower determinant levels (e.g., numbers) within a determinant classification are more urgent than higher numbers. For example, an emergency dispatch call with a determinant value of D-1 is generally more critical and requires a more urgent response than a call with a determinant value of D-2. However, in some instances, the numeric determinant levels within a determinant value may serve only to identify the type, rather than criticality of the call. Also, if more than one determinant value can be assigned to a particular call, the more critical or higher determinant value is assigned. That is, the call is assigned a criticality determinant value based on the fact or aspect that would lead to the most urgent response. For example, if the call concerns a burglary that occurred over 30 minutes before, but where the suspect remains on the scene or nearby and the caller indicates that he or she is still in danger and feels his or her life is in imminent danger, then the determinant value assigned would be E-1 (due to the imminent danger) rather than D-2 (suspect on scene or nearby) or B-1 (incident occurred over 30 minutes before).

Many calls for law enforcement are not true emergencies, so it is important to prioritize the calls in several ways. First, calls that are true emergencies should be dispatched first. Second, if an agency has units with different capabilities, the emergencies involving more severe problems can be sent units that are more skilled and advanced (e.g., a S.W.A.T. team or bomb squad). And finally, if lights-and-siren are not needed, they should not be used, thereby increasing the safety of all those on the road and in the emergency response vehicles. The computer 106 presents the determinant value to generate an appropriate emergency dispatch response and/or establish the priority of the emergency call. The response may include dispatching professional law enforcement officers or other emergency responders to the scene of the emergency. The protocols used shall have passed through a rigorous review by a panel of experienced law enforcement agents and EMS public safety experts.

The determinant value may be provided to a Computer Aided Dispatch (CAD) system 112, which is a tool that a dispatcher 104 may use to track and allocate emergency response resources for processing emergency calls. The CAD system 112 may manage dispatcher tools for processing emergency calls, including but not limited to the emergency police dispatch protocol 108, communication resources (e.g., radio system, alpha pager), mapping tools (e.g., global positioning system (GPS) technology, geographic information systems (GIS)), and vehicle location systems (e.g., automatic vehicle location (AVL)). The CAD system 112 may operate in whole or in part on a separate computer in communication with the computer 106. In another embodiment, the CAD system 112 operates on the computer 106. The primary information used by the CAD system 112 is location information of the incident and units, unit availability, and the type of incident. The CAD system 112 may use third party solutions, such as E-911, vehicle location transponders, and mobile data terminals (MDT's) for automating the location and availability tasks. The CAD system may also use an emergency police dispatch protocol 108 to facilitate structured call taking for incident interrogation, as previously described.

Although many emergency calls are not true emergencies, all situations can benefit from expert evaluation and pertinent instruction. Prior to the arrival of professional help on-scene, the emergency police dispatch protocol 108 may provide the dispatcher 104 with instructions for the caller 118 that are appropriate to the type of call, whether the call relates to a complaint of vandalism or to a homicide. These instructions may help expedite the work of law enforcement officers and/or other emergency responders.

The computer 106 may include a reporting component 114 to statistically measure the performance of individual staff and overall performance of the dispatch center 102. To record information received during a call, the dispatcher 104 may be required to open a new case. Once the call is complete, the dispatcher 104 may close the case, and a case summary may be saved. The case summary may be retrieved later for review and/or analysis. The reporting component 114 may determine statistics from the case summaries and/or while the cases are open. The statistics may include compliance rates, call processing statistics, and peer measurements.

The computer 106 may further comprise an input device 128, such as a keyboard, mouse, touch screen, laser pointer, or other input device, and also an output device 130, such as a display monitor. The input device 128 receives input from a user (generally a dispatcher) and provides the input to the emergency police dispatch system 100. The input may be provided to the computer 106, the emergency protocol 108, the diagnostic tool 120, and/or the CAD system 112. An output device 130 receives output from the emergency police dispatch system 100 and displays or otherwise provides the output to the user. In another embodiment, the input device 128 and output device 130 are provided by the CAD system 112.

The dispatch center 102 includes a communication device 116 (e.g., telephone equipment) to answer emergency calls. In some embodiments, the communication device 116 may be coupled to the computer 106 to enable the computer 106 to send and/or receive text messages and/or to identify dual-tone multi-frequency (DTMF) signals received at the communication device 116. A call into the dispatch center 102 from a caller 118 may initiate creation of an emergency call incident. The dispatcher 104 identifies the call as requiring an emergency police dispatch, and the emergency police dispatch protocol 108 is accessed. The protocol 108, including the dispatch protocols 124, may provide questions and/or instructions that are expertly drafted to assist a novice caller 118 in reporting aspects of the incident, and/or assessing a situation of a victim 117. The protocol 108 may also provide expertly drafted instructions to assist a victim 117 prior to the arrival of trained law enforcement and/or emergency responders. The instructions may be vocally relayed by the dispatcher 104 to the caller 118 over the communication device 116.

Some protocol inquiries or questions may be readily answerable by the caller 118, whereas others may be more difficult to answer. Certain diagnostic inquiries may be difficult for the untrained caller to determine or may be difficult to answer under the stress of an emergency situation. Accordingly, in addition to instructions, the emergency police dispatch system 100 may provide one or more computer-implemented diagnostic tools 120. The diagnostic tools 120 may greatly improve information collection and intervention for emergency police response situations and aid in saving lives.

A diagnostic tool 120 may aid the dispatcher 104 and/or the caller 118 (via instructions from the dispatcher 104) in assessing a situation of a victim 117. A diagnostic tool 120 may also be an interventional tool, providing instructions that direct a caller 118 to intervene, or take action, to aid a victim 117, or otherwise change the circumstances or conditions of an emergency situation. For sake of clarity, diagnostic tools and interventional tools are both referred to herein generally as diagnostic tools. Accordingly, a diagnostic tool 120, as referred to herein, may provide diagnostic instructions, interventional instructions, or both diagnostic and interventional instructions. Whether a diagnostic tool 120 provides merely diagnostic instructions, merely interventional instructions, or both diagnostic and interventional instructions, the diagnostic tool provides consistent and reliable instruction, information gathering, and/or timing for a particular emergency situation.

The diagnostic tools 120 are computer implemented software modules that enable a dispatcher 104 to provide consistent, expert advice to assist a caller with regards to a particular aspect of an emergency situation, such as determining a vital sign. One benefit of the diagnostic tools 120 is the computer-aided timing of techniques to determine the vital signs. In highly stressful conditions, the diagnostic tools 120 provide a necessary resource to reading critical signs. The diagnostic tools 120 may be stored in the memory of the computer 106 and initiated and executed as required. The diagnostic tools 120 may be embodied as computer-executable software applications and associated data.

The emergency police dispatch protocol 108, including the dispatch protocols 124, also may call on one or more diagnostic tools 120 to assist with an inquiry and may route to the appropriate diagnostic tool 120 when needed. When directed according to the protocol, the emergency police dispatch protocol 108 may automatically, i.e., without dispatcher intervention, initiate the appropriate diagnostic tool 120. This may occur when the emergency police dispatch protocol 108 arrives at a diagnosis or assessment step in the logic tree. The emergency police dispatch system 100 may also allow the dispatcher 104 the option to call upon a diagnostic tool 120 as desired. Icons may be displayed in a tool bar or other convenient location on a user interface to allow the dispatcher 104 to initiate a corresponding diagnostic tool 120.

Figure 2:
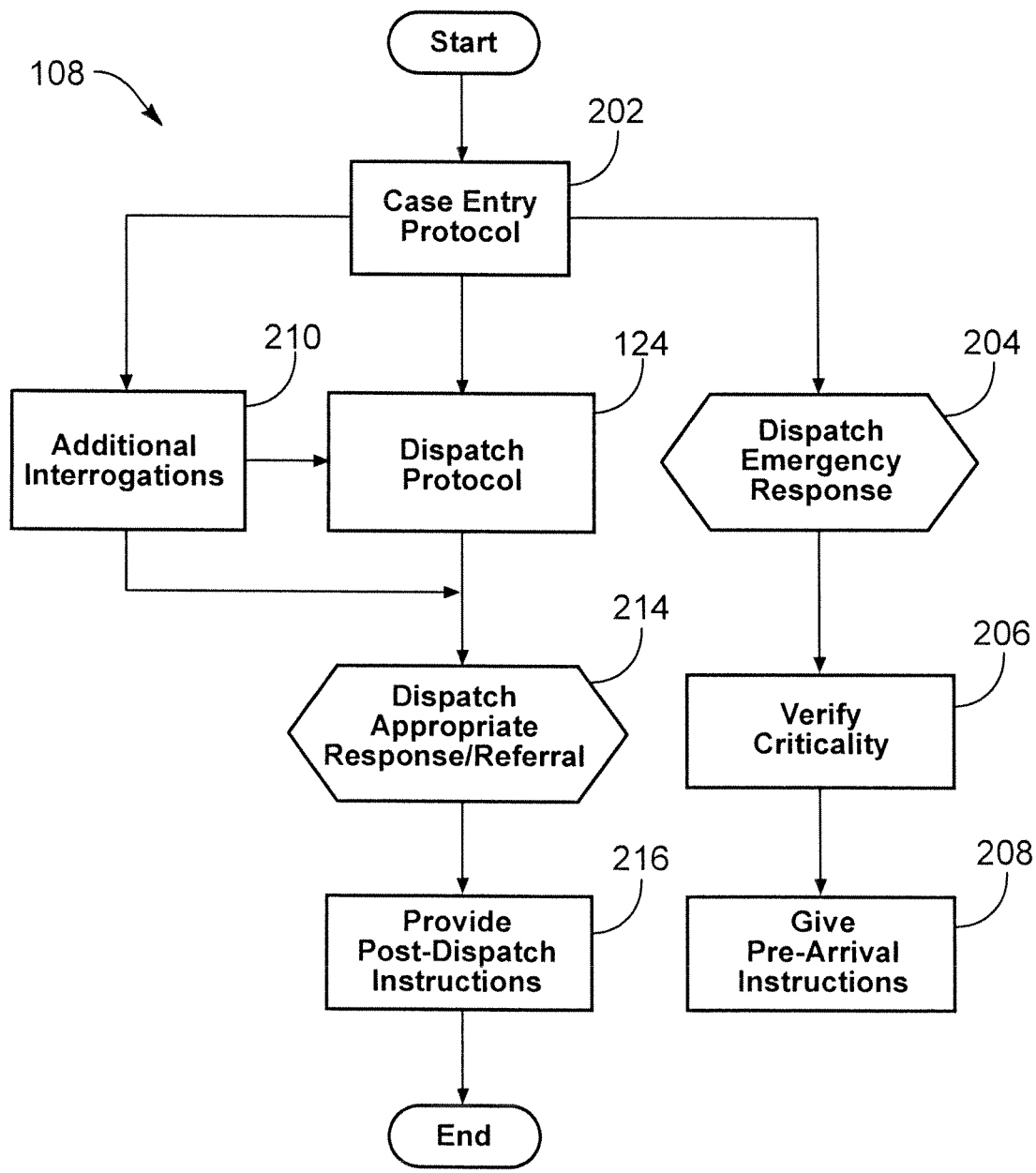
FIG. 2 is a flow diagram of an emergency police dispatch protocol of an emergency police dispatch system, according to one embodiment.

FIG. 2 is a high-level flow diagram of an emergency police dispatch protocol 108 of an emergency police dispatch system, according to one embodiment. The protocol 108 may begin with a case entry protocol 202 that guides the dispatcher in gathering initial information. One aim of the case entry protocol 202 is to obtain sufficient information from the caller to permit identification of a chief complaint. Also, the case entry protocol 108 may be considered a primary interrogation because all calls may be processed through the case entry protocol 202 to gather initial incident information. The information received through the case entry protocol 202 may include a location of the incident, a call-back number in the event the call is disconnected, the caller's name, and a description of the incident.

If the dispatcher receives and enters information that an incident is especially critical (e.g., an active assailant, a caller in imminent danger, a sinking vehicle, a vehicle in rising flood water, or a stuck accelerator and cannot stop vehicle), for whatever reason, an emergency response is dispatched 204 immediately, before continuing with any further interrogation or instructions. The dispatched 204 emergency response may be a maximum emergency response, including properly trained law enforcement officers. The criticality of the incident 206 is verified and pre-arrival instructions are given 208. The pre-arrival instructions can be tailored to the specific incident and/or situation. Typically, a result of properly conveyed (by the dispatcher) and executed (by the caller) pre-arrival instructions may be a more calm, stable situation at the time the law enforcement emergency responders arrive, and/or reduced risk of injury or death for the caller. The pre-arrival instructions may aid to ensure safety and improve the effectiveness of the dispatched 204 emergency response.

If the dispatcher receives information from the caller to confirm the incident is not critical (e.g., not an imminent danger), but the dispatcher lacks sufficient information to proceed directly to a dispatch protocol 124, the emergency police dispatch protocol 108 may shunt to additional inquiries 210 designed to guide the dispatcher to gather information from the caller to enable the dispatcher to ascertain the chief complaint. If the chief complaint is determined, the emergency police dispatch protocol 108 may shunt to the appropriate dispatch protocol 124 for dealing with that chief complaint.

The dispatch protocol 124 may guide the dispatcher through a secondary interrogation focusing on the chief complaint. The dispatch protocol 124 may present a pre-scripted interrogation to enable a more orderly and detailed understanding of the incident that can be communicated to law enforcement emergency responders. The pre-scripted interrogation may include preprogrammed inquiries focused on gathering information relating to the chief complaint. The preprogrammed inquiries provided by the dispatch protocol 124 may be termed "Key Questions" for the particular situation or condition of the chief complaint. The preprogrammed inquiries presented may depend on caller responses. Verifying 206 the criticality of the incident and giving 208 pre-arrival instructions may include traversing the logic tree of the dispatch protocol 124. Dispatch protocols 124, in general, are discussed in greater detail below with reference to FIG. 4. The instant disclosure includes, inter alia, a dispatch protocol 124 configured to process an emergency call involving an active assailant, namely a dispatch protocol 124 including an active assailant protocol 126. The active assailant protocol 126 will be discussed in greater detail below with reference to FIGS. 3A-C, 5A-D, and 6A-6E.

During the dispatch protocol 124, the dispatcher and/or the emergency police dispatch protocol 108 will gather information about the circumstances of the incident or emergency situation, discovered through interrogation, and may dispatch 214 an appropriate emergency dispatch response. The dispatch protocol 124 facilitates uniform and consistent gathering of information relating to the emergency and dispatching of an appropriate emergency dispatch response. The appropriate emergency dispatch response may be determined through a system of assigning determinant values as the protocol progresses (i.e., traverses) through a logic tree. The determinant values, as described above, may range, for example, from E-1 for generally very serious emergencies to Ω-2 for generally less serious emergencies. In another embodiment, the determinant values may range from, for example, E-1 for generally very serious emergencies to A-2 for generally less serious emergencies. In still another embodiment, the determinant values may range differently, such as for example from A-1 for generally very serious emergencies to E-5 for generally less serious emergencies.

After the appropriate emergency dispatch response has been sent (e.g., law enforcement officers), the dispatcher may remain on the telephone with the caller to provide post-dispatch instructions 216 regarding what to do, and what not to do, prior to the arrival of law enforcement officers. The post-dispatch instructions 216 help to stabilize the situation, and to expedite the work of law enforcement officers at the scene. Post-dispatch instructions may include, for example, "do not disturb anything at the scene, including weapons, tools, or objects found nearby," "stay on the line and I'll tell you exactly what to do next," and the like.

Figure 3A:
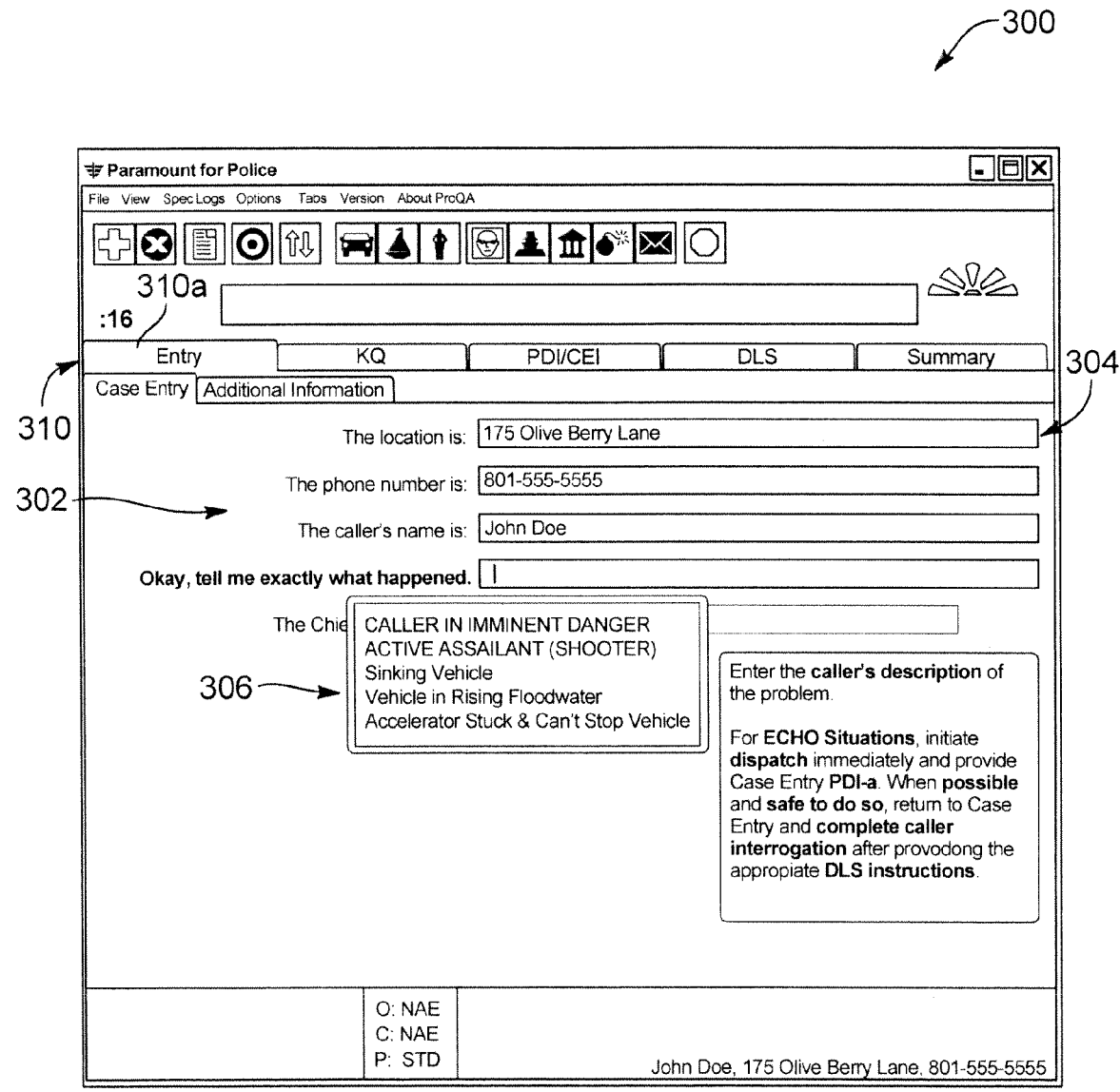
FIGS. 3A-3C are a user interface of an emergency police dispatch system, according to one embodiment.
Figure 3B:
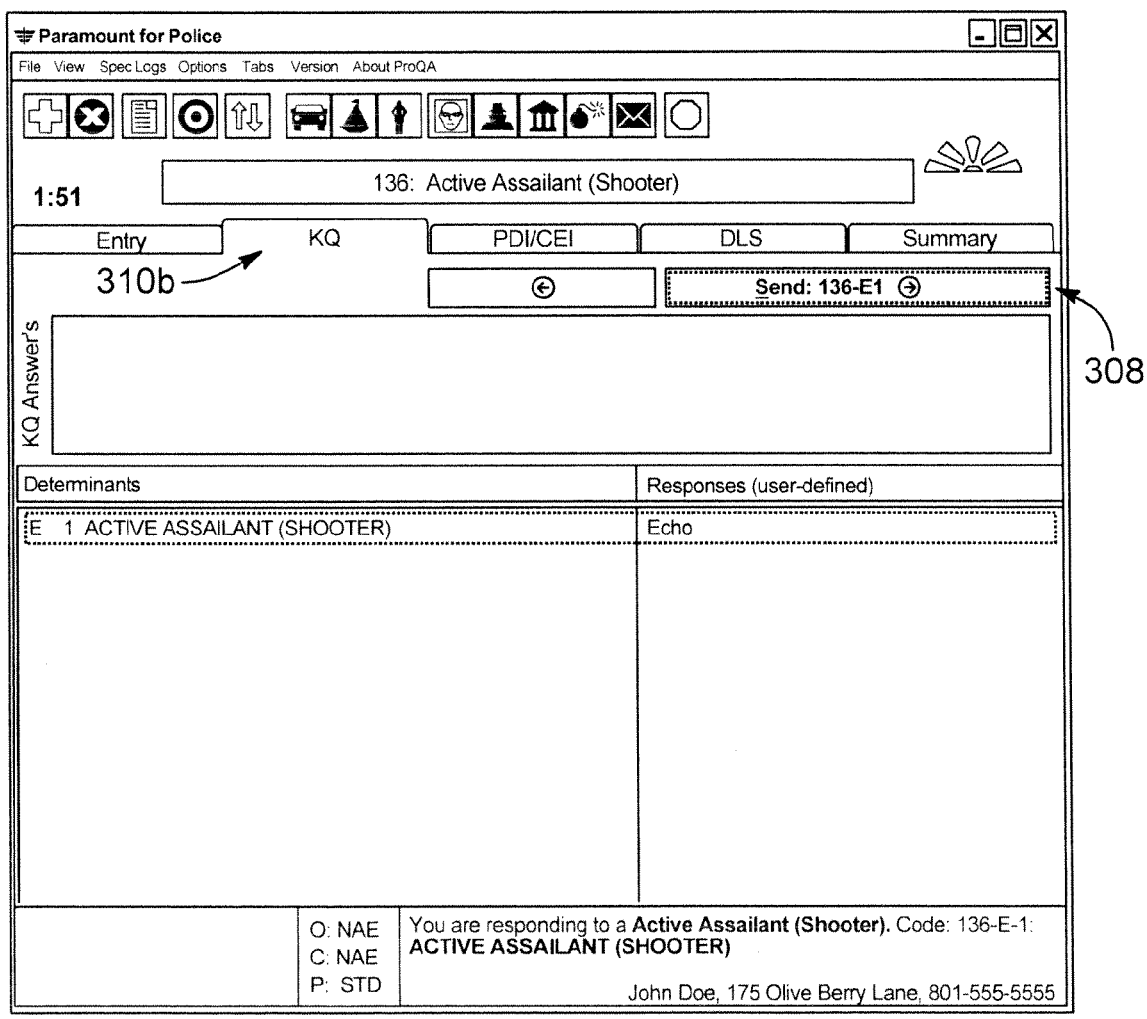
Figure 3C:
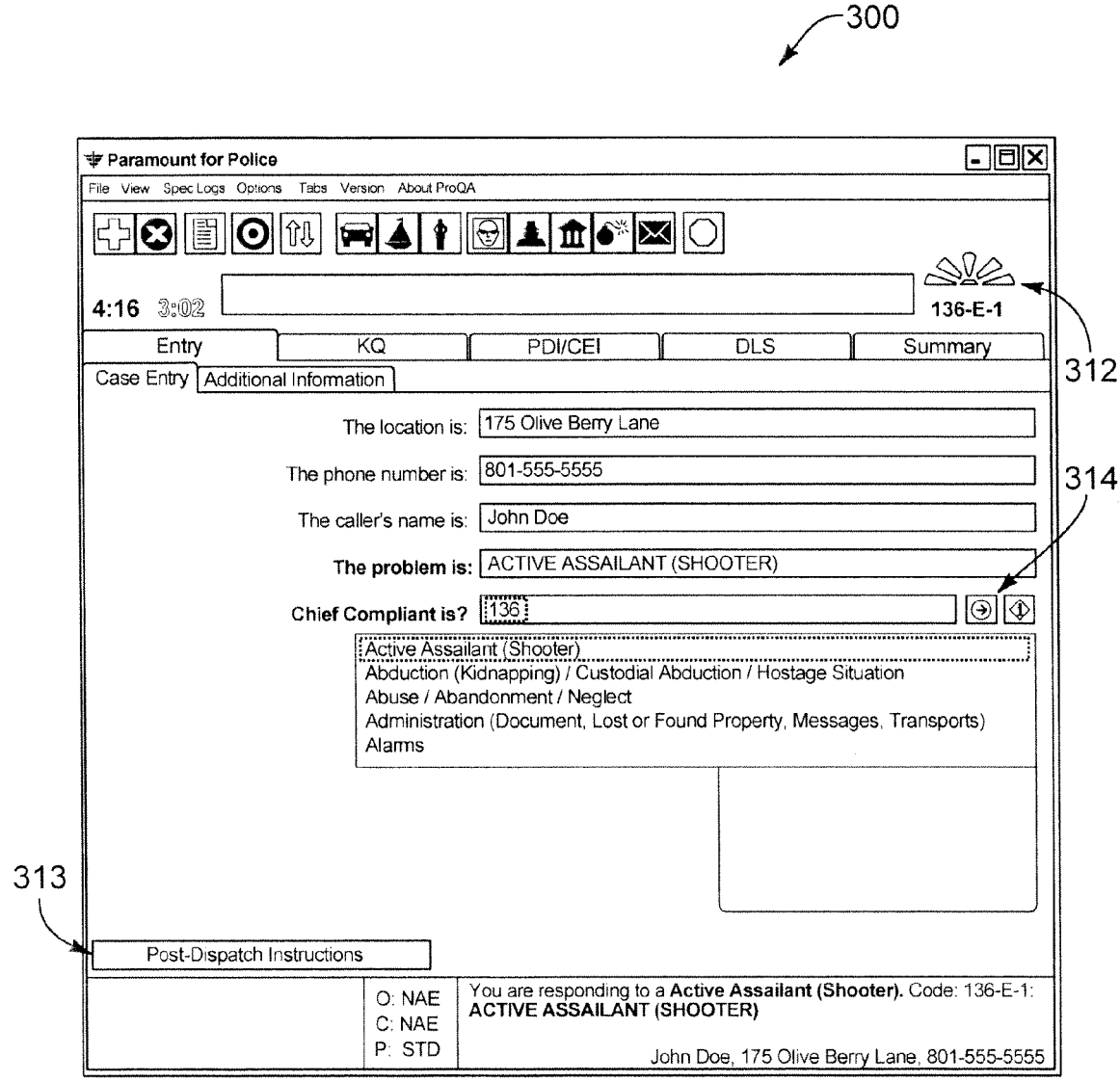

FIGS. 3A-3C are a user interface 300 of an emergency police dispatch system, according to one embodiment. The emergency police dispatch system user interface 300 allows a dispatcher to interface with the emergency police dispatch protocol. The illustrated user interface 300 is shown traversing a case entry protocol 202 of the emergency police dispatch protocol 108 (described above with reference to FIG. 2). The emergency police dispatch protocol may present inquiries 302 (or questions) via the emergency police dispatch system user interface 300. The inquiries 302 are provided for the dispatcher to relay to the caller to gather information regarding the reported incident or emergency. The dispatcher and/or the emergency police dispatch system may gather the information in the form of caller responses to the inquiries 302. The dispatcher may input the responses of the caller to the inquiries into response fields 304 provided by the user interface 300. The response fields 304 may include, for example, any of a number of appropriate input field types, including but not limited to text fields, text boxes, menus, drop down menus, drop-down selection boxes, lists, buttons, check boxes, radio buttons and/or hybrid fields. For example, a text field for identifying the problem may allow for freeform input but also provide a list of suggestions (e.g., echo situations 306) to the dispatcher that can be inserted into the text field by clicking and/or double clicking an entry in the list. The response fields 304 may correspond to information indicative of one or more responses of the caller to the inquiries 302. In some embodiments, the inquiries 302 may change from an interrogative form to an assertional form after a response has been entered and/or when a cursor is not in the corresponding response field.

The caller responses are relayed from the caller to the dispatcher, typically over the telephone. Information from the caller responses may be input into the system by the dispatcher and may be used by the emergency police dispatch protocol to determine subsequent inquiries 302 and instructions to present to the dispatcher. The caller response information may indicate the caller's observations of the incident and/or current situation. The emergency police dispatch system may use the caller response information to generate an emergency police dispatch response by properly trained law enforcement officers. The information gathered from the caller responses may be used by the determinant value calculator to calculate a determinant value that can be communicated to the emergency responders. Additional details relating to emergency police dispatch protocols and user interfaces to interact with the same can be found in the earlier referenced U.S. patents. In addition, similar concepts are discussed below in relation to a dispatch protocol, in particular an active assailant protocol, with reference to FIGS. 4, 5A-D, and 6A-6E.

The user interface 300 may further comprise tabs 310 to aid in organizing and/or compartmentalizing various aspects of processing a call. The tabs 310 may include a tab 310a for presenting a case entry protocol portion of an emergency police dispatch protocol (e.g., "Entry" tab). Other tabs may include a tab 310b for presenting a dispatch protocol portion of the emergency police dispatch protocol (e.g., a "KQ" tab or Key Questions tab), a tab for presenting post-dispatch instructions and/or critical EMD information (e.g., a "PDI/CEI" tab), a tab for dispatching life support (e.g., a "DLS" tab), and a tab summarizing the call and/or processing of the call (e.g., "Summary" tab). The KQ tab, PDI/CEI tab, DLS tab, and Summary tab are discussed below with reference to FIGS. 6A-6E.

If the caller indicates that the problem is one of a predetermined set of echo situations 306, the dispatcher may be able to select that problem from a list. In response, the case entry protocol 202 may automatically jump to the KQ tab 310b and may provide an input, such as a send determinant button 308, allowing the dispatcher to set a determinant value of E-1 and/or send the determinant value and/or case entry responses to the CAD system 112. The determinant value may also include a prefix indicative of the type of incident, such as "136" for active assailant incidents. Police officers and/or other emergency personnel may be dispatched immediately in the most urgent manner available once the determinant value has been sent. Once the determinant value has been set, post-dispatch instructions may be provided, such as "I'm sending help to you now. Stay on the line, and I'll tell you exactly what to do next." Next, the case entry protocol 202 may continue where it left off but allow the dispatcher to retrieve the previously provided dispatch instructions if need be using a post-dispatch instructions button 313. The user interface 300 may include an indication 312 of the current determinant value once one has been set.

The user interface 300 may provide an input component 314 for the dispatcher to indicate when the portion of the emergency police dispatch protocol presented by the tab 310a has been completed. The input component 314 may be a navigation button, as illustrated in FIG. 3C, to enable a dispatcher to provide input that indicates to the user interface 300 that the dispatcher is ready to proceed to a next phase of the emergency police dispatch protocol. The dispatcher may also be able to double click on a chief complaint, use arrow keys, tabs, and/or the enter or return key to indicate a chief complaint, or the like to jump to the portion of the dispatch protocol 124 for that complaint.

Figure 4:
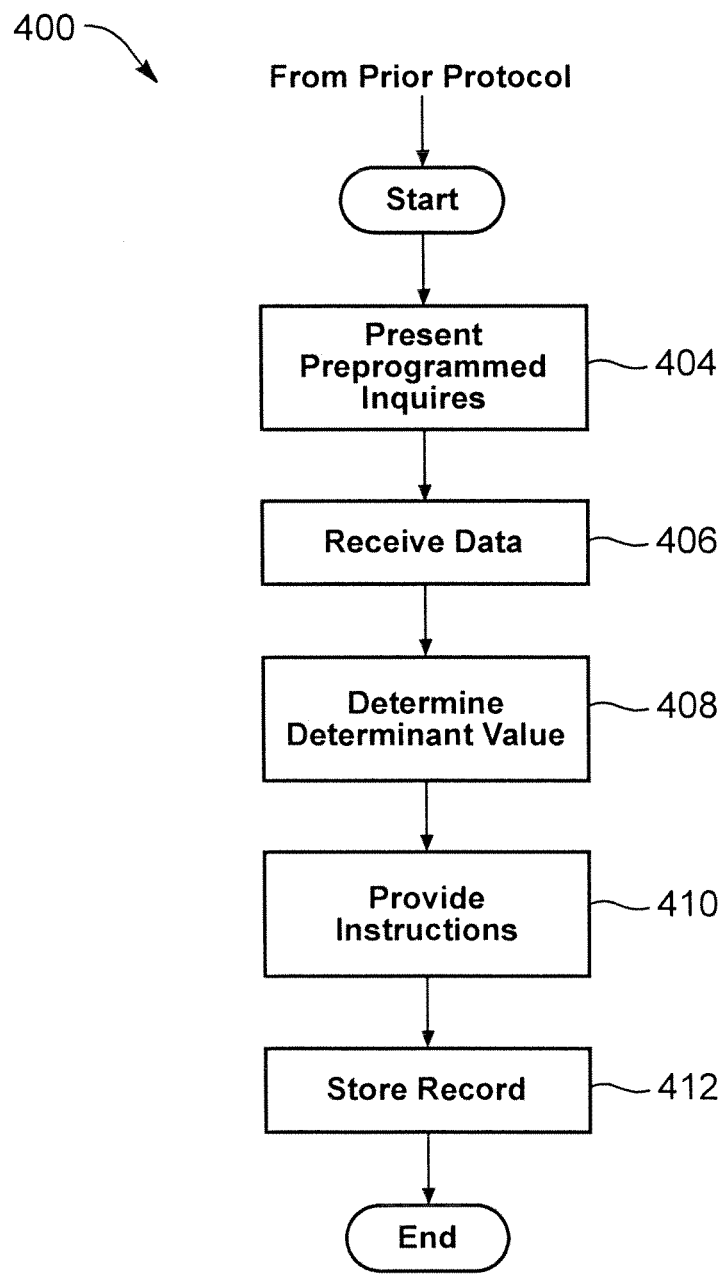
FIG. 4 is a high-level flow diagram of a method of a dispatch protocol for an emergency dispatch system, according to one embodiment.
Figure 5A:
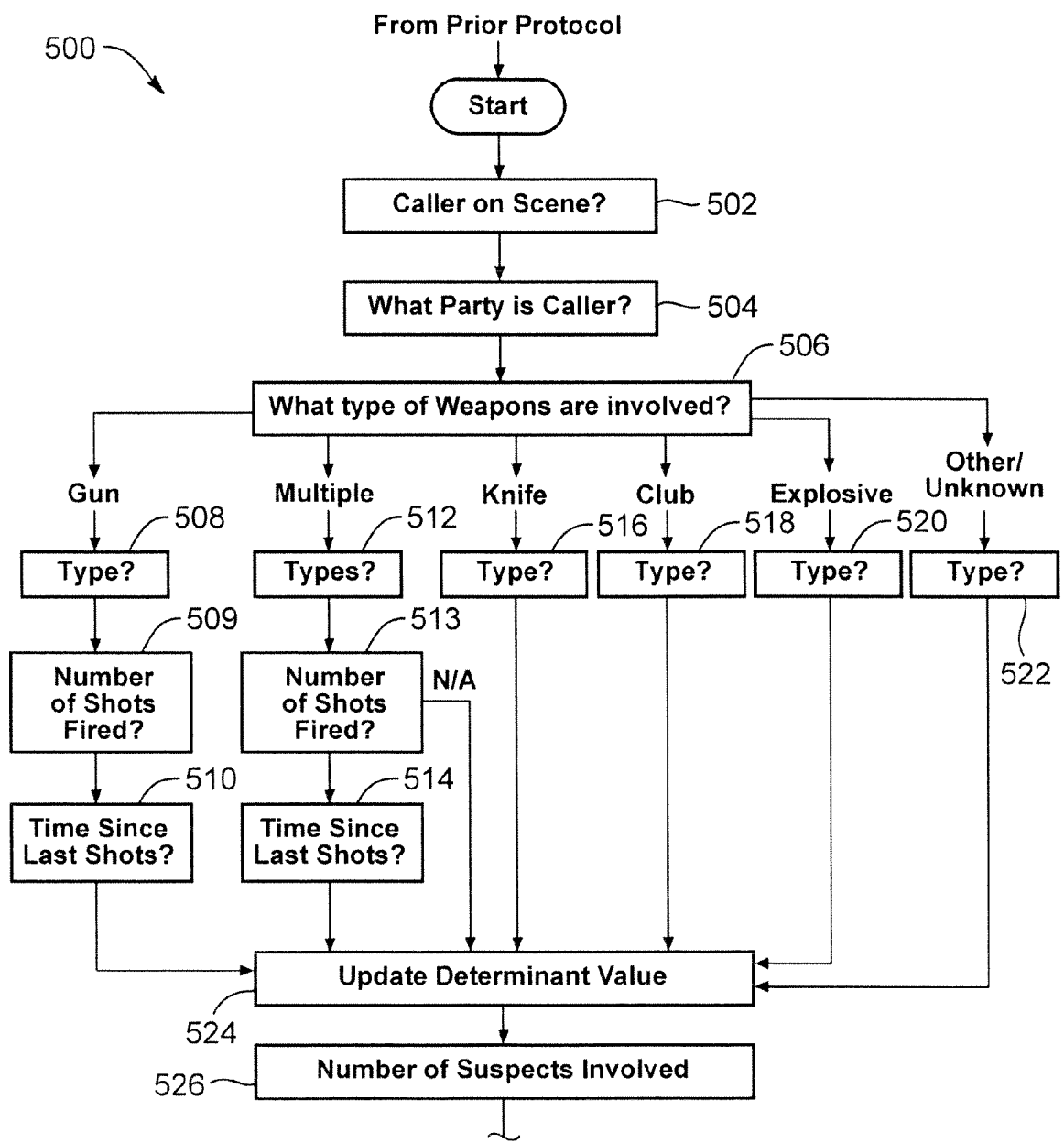
FIGS. 5A-D are a flow diagram of a method of an active assailant protocol for an emergency dispatch system, according to one embodiment.
Figure 5B:
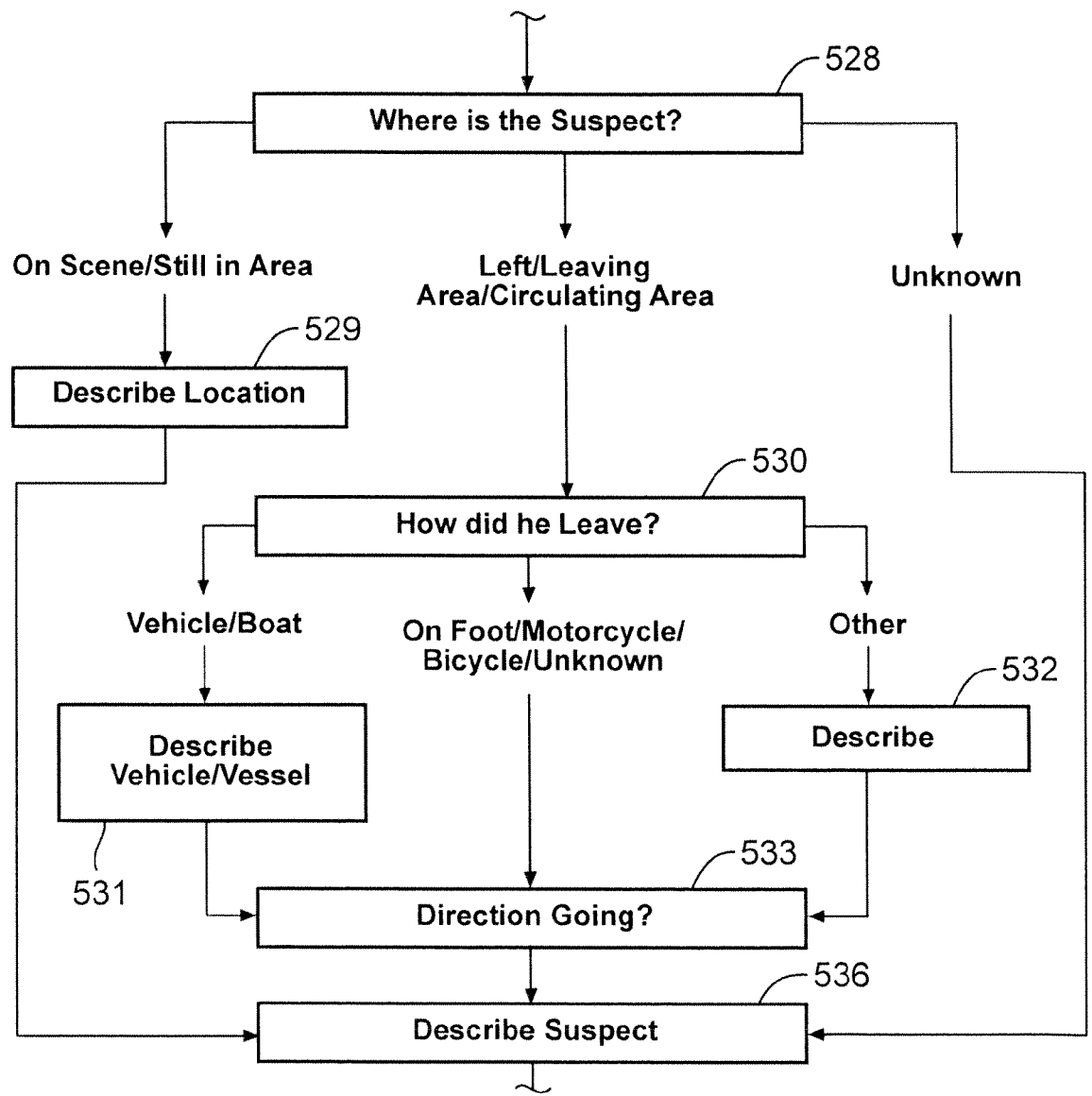
Figure 5C:
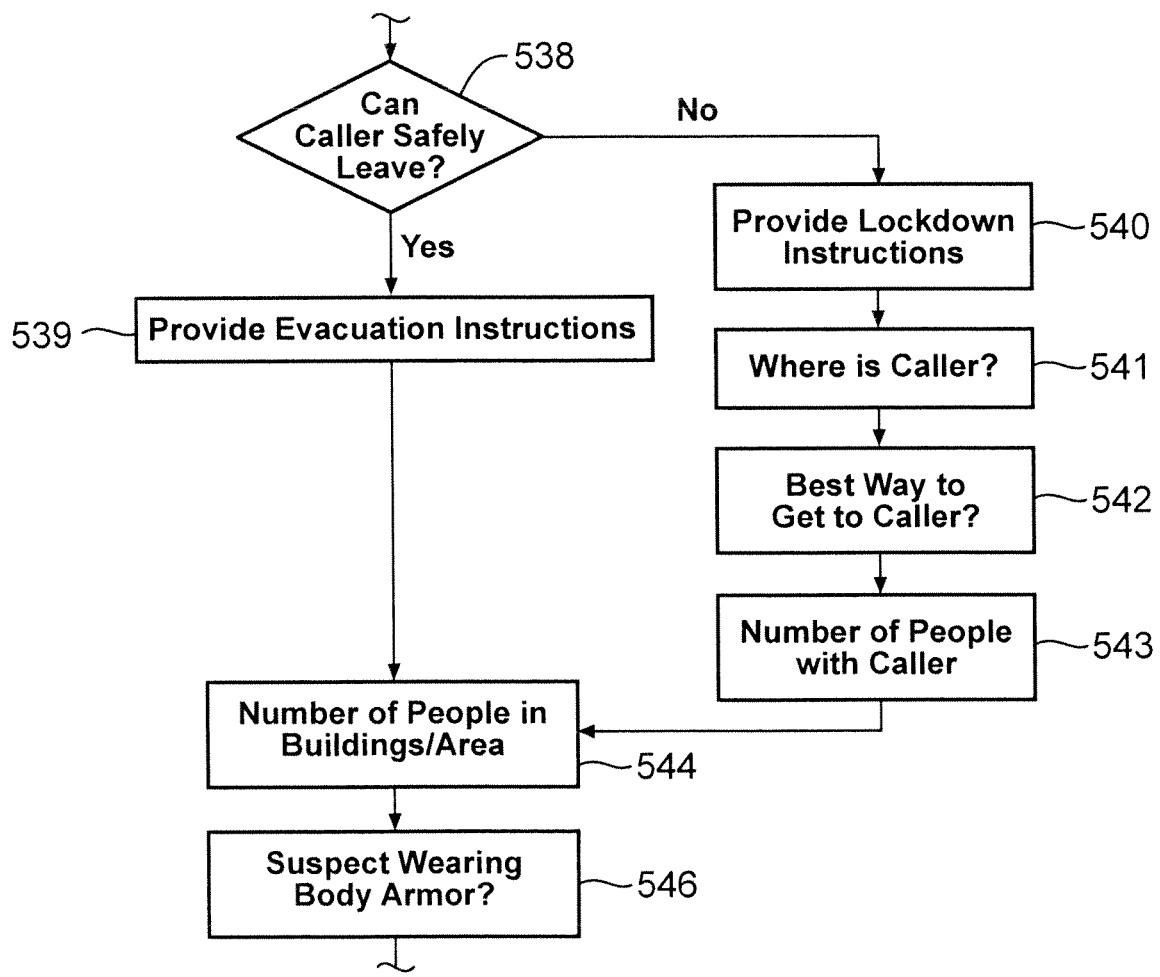
Figure 5D:
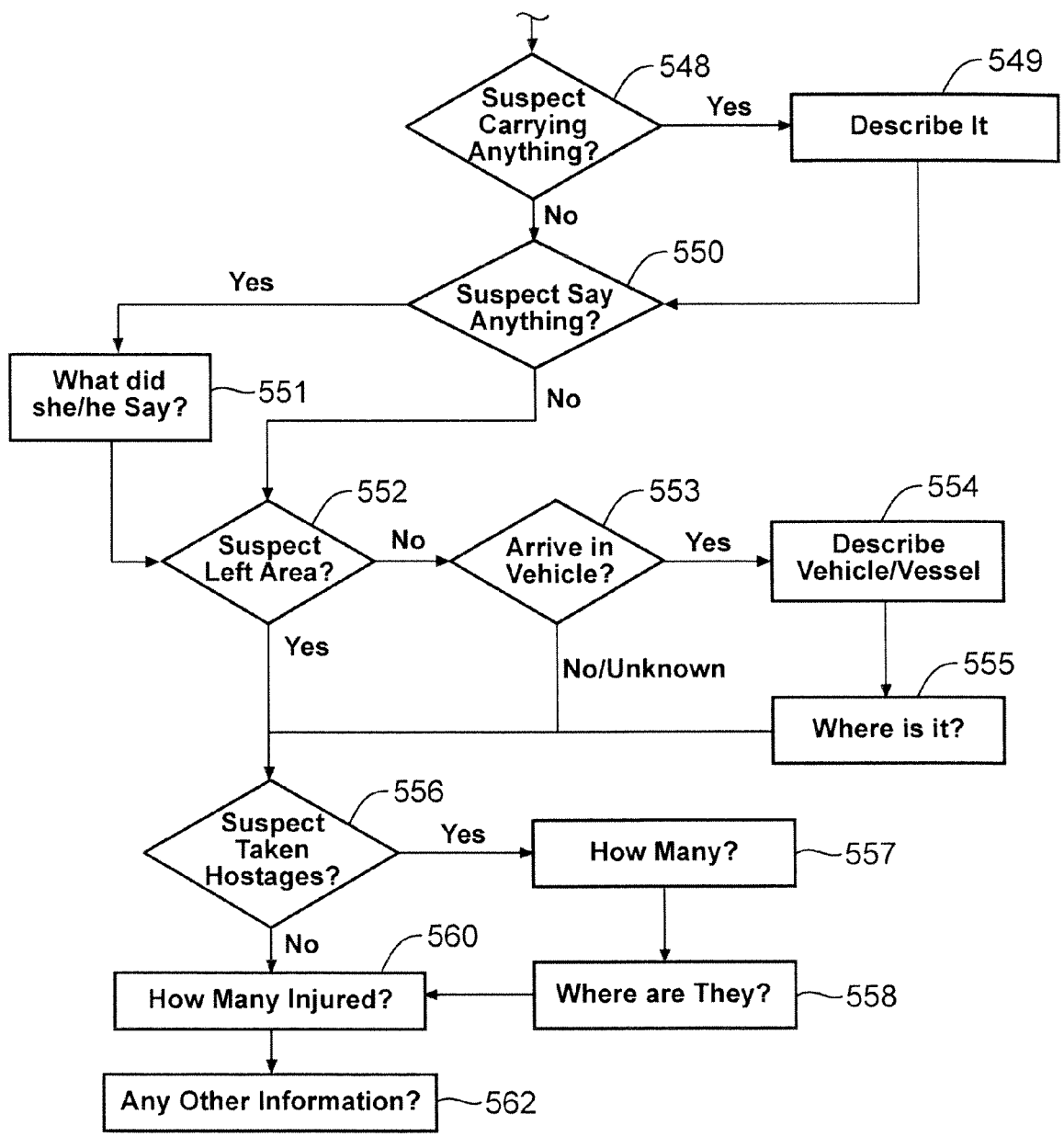

FIG. 4 is a high-level flow diagram of a method 400 implemented by a dispatch protocol 124 (FIG. 1) for an emergency dispatch system, according to one embodiment. The dispatch protocol 124 may include an active assailant protocol 126, an example of which is described in greater detail below with reference to FIGS. 5A-D and 6A-6E. The dispatch protocol facilitates uniform and consistent gathering of information relating to the reported chief complaint. Generally, but not always, the dispatch protocol initializes from a prior protocol. The prior protocol may be a case entry protocol. In some instances the prior protocol may be a different dispatch protocol, from which a determination was made to shunt to a more appropriate dispatch protocol. The determination to shunt may be made automatically by the prior protocol or manually by the dispatcher. For a call involving an active assailant, the appropriate dispatch protocol may be an active assailant protocol, such as the active assailant protocol 126 described below with reference to FIGS. 5A-D and 6A-6E.

The dispatch protocol may present 404 preprogrammed inquiries according to a pre-scripted interrogation. The preprogrammed inquiries may also be referred to as "Key Questions," targeted to ascertain the criticality of the incident or situation and typically are based on the chief complaint. Data is received 406 from the dispatcher, as relayed from the caller, following the preprogrammed inquiries asked to the caller by the dispatcher. The data received 406 may correspond to caller responses to the preprogrammed inquiries. The data may be used to determine subsequent questions, or to determine instructions to provide to the dispatcher. The received data is also used by the protocol to determine 408 a determinant value and/or update an already determined determinant value. Intermediate determinant values may be produced as information is received and processed, and the final determinant value may be determined after all information is received and processed.

The dispatch protocol may provide 410 appropriate instructions to be relayed to the caller by the dispatcher. The instructions may comprise post-dispatch instructions for the caller to help stabilize or otherwise ameliorate a situation and to expedite the work of law enforcement officers at the scene. In one embodiment, the dispatch protocol may include an active assailant protocol. A database may be accessed to produce appropriate instructions. Records of the calls are stored 412 for historical reports, for review and analysis of dispatcher performance, and for continued quality assurance control. A record of a call may include, but is not limited to inquiries, responses, and determinant values.

FIGS. 5A-D are a detailed flow diagram of a method 500 implemented by an active assailant protocol 126 (FIG. 1) for an emergency dispatch system, according to one embodiment. The active assailant protocol 126 is initialized, typically, from a prior protocol. In particular, the active assailant protocol 126 may be launched from the case entry protocol. As can be appreciated, the active assailant protocol 126 may be accessed a variety of ways. In an embodiment, the active assailant protocol 126 may initialize once the emergency dispatch protocol has traversed all or a portion of a case entry protocol and shunts to the active assailant protocol 126 as the appropriate dispatch protocol for handling the chief complaint of the call. Also, an emergency police dispatch protocol may automatically shunt to the active assailant protocol 126 immediately upon receiving indication that an active assailant event is being reported.

The active assailant protocol 126 may present to the dispatcher a series of preprogrammed inquiries. The preprogrammed inquiries may be considered a part of a pre-scripted interrogation that is based on a logic tree of the active assailant protocol 126. (The flow diagram of FIGS. 5A-D may be considered to portray a logic tree, according to one embodiment). The preprogrammed inquiries that are presented as part of a pre-scripted interrogation may depend on dispatcher-entered input as will be described. A pre-scripted interrogation may be considered to be a set of preprogrammed inquiries presented according to traversal of a path along the logic tree.

During a pre-scripted interrogation, the active assailant protocol 126 may receive input from the dispatcher corresponding to instructions and preprogrammed inquiries, as was explained above with reference to FIG. 4. The input may be received substantially in real-time, as the dispatcher provides the input. Alternatively, or in addition, the input may be received from the emergency police dispatch system 100 because information sought by the active assailant protocol 126 may have previously been obtained from the dispatcher via the case entry protocol and/or another portion of the dispatch protocol 124. Alternatively, or in addition, the input may be received from a diagnostic tool 120. While explicit steps of receiving information are not depicted in FIGS. 5A-D, an ordinarily skilled artisan will recognize that input may be received at various points in the method 500 of the active assailant protocol 126.

The dispatcher-entered input relates to the emergency call and/or the reported incident. The dispatcher-entered input may affect the path along which the logic tree is traversed. Various paths through one embodiment of a logic tree of an active assailant protocol 126 will now be described, including the corresponding preprogrammed inquiries and potential dispatcher-entered input that may be considered.

The active assailant protocol 126 may initially seek critical information necessary for responder safety before providing any additional post-dispatch and/or pre-arrival instructions. The information collected can heavily influence the tactics utilized by responders and law enforcement administration and can also benefit EMS and Fire agencies that may be assisting with the incident. The dispatcher may be presented 502 a preprogrammed inquiry, "Are you at that location now?," to relay to the caller. The dispatcher may input an affirmative or negative response and/or a freeform text response. A determination 504 may be made whether the caller is the victim, a 2nd party, a 3rd party, a 4th party, or a suspect. The active assailant protocol 126 may present a preprogrammed inquiry to the dispatcher (which may be relayed to the caller) inquiring what party the caller is and present options such as "2nd party," "3rd party," "4th party," or "Suspect" and/or the information may have been previously gathered as part of the case entry protocol or as part of an earlier dispatch protocol. The caller location and caller identity may allow the dispatcher to quickly triage a large volume of calls. In an embodiment, if the caller is not on scene and/or is a 3rd or 4th party, then the active assailant protocol 126 may automatically end and/or allow the dispatcher to close the case. In other embodiments, the dispatcher may be required to ask additional critical safety questions before the case can be closed.

The dispatcher may be presented 506 a preprogrammed inquiry, "What type of weapons are involved?" Possible responses presented to the dispatcher may include "Gun;"

"Multiple:," Knife:," "Club:," "Explosive:," "Other:," and "Unknown:." For any response, the active assailant protocol 126 may present 508, 512, 516, 518, 520, 522 a preprogrammed inquiry and/or prompt to input the type(s) of weapons involved. The dispatcher may input the type of weapon into a freeform text box, and/or the dispatcher may receive suggestions of possible weapon types. If a gun or multiple weapons are involved, the dispatcher may be presented 509, 513 with a preprogrammed inquiry, "How many shots have been fired?" The dispatcher may be able to input the response into a freeform text box, select a preprogrammed response of "Unknown," and/or, for multiple weapons, select a preprogrammed response of "Not Appropriate" or "Not Applicable." If a response other than "Not Appropriate" is selected, the dispatcher may be presented 510, 514 with a preprogrammed inquiry, "When was the last time you heard shots fired?" The dispatcher may be able to input the response into a freeform text box and/or select a preprogrammed response of "Unknown."

The information about the weapon(s) may allow responding officers to determine what risks they face, which may be very different for handguns versus high-powered rifles. Similarly, responding officers may use a different tactical response for an active assailant with a knife versus an active assailant with a handgun. The number of shots fired and/or when the last shots were fired may allow the dispatcher and/or responding officers to determine the level of activity of the assailant. Additionally, asking when shots were last fired may allow the dispatcher to determine which callers have the most up-to-date information because of their proximity to the assailant.

The active assailant protocol 126 may update 524 the determinant value based on the information about the weapon(s). For example, a suffix indicative of the type of weapon may be added to the determinant value, such as "G" for gun, "M" for multiple, "K" for knife, "C" for club, "E" for explosive, and "O" for other or unknown. In some embodiments, the determinant level may not be changed based on the length of time since shots were last heard. In other embodiments, the determinant level may be changed based on the answers to the preceding preprogrammed inquiries.

The dispatcher may be presented 526 with a preprogrammed inquiry, "How many suspects are involved?" The active assailant protocol 126 may present possible responses, such as "One," "More than one (enter number):," which may launch a freeform text box for inputting an exact number, and "Unknown." The active assailant protocol 126 may present 528 a preprogrammed inquiry, "Where's the suspect now?" Possible response presented to the dispatcher may include "On scene:," "Still in area:," "Left/leaving area," "Circulating the area," and "Unknown." If the response indicates the suspect is on scene or still in the area, the active assailant protocol 126 may present 529 a freeform text box allowing the dispatcher to include additional detail describing the suspect's location.

If the response indicates that the suspect left the area, is leaving the area, or is circulating the area, the dispatcher may be presented 530 a preprogrammed inquiry, "How did s/he leave?" The dispatcher may be presented a plurality of possible responses, such as "Vehicle," "Boat," "On foot," "Motorcycle," "Bicycle," "Other:," and "Unknown." If "Vehicle" or "Boat" is selected, the active assailant protocol 126 may present 531a preprogrammed inquiry, "Obtain the vehicle description." and preprogrammed responses of "Info:," which may launch a diagnostic tool for obtaining a description of the vehicle, and "Unknown." The diagnostic tool for obtaining the description of the vehicle may include a plurality of inquiries and response fields for additional descriptive details about the vehicle. If "Other" is selected in response to preprogrammed inquiry 530, a freeform text box may be presented 532 allowing the dispatcher to include additional information. In the illustrated embodiment, no additional information about the suspect's method of departure is requested if the suspect is on foot, on a motorcycle, on a bicycle, or the method of departure is unknown. In other embodiments, a vehicle description and/or other information may be obtained for these methods of departure. For any of the methods of departure, the dispatcher may be presented 533 a preprogrammed inquiry, "What direction was s/he going?" The dispatcher may be able to select a preprogrammed response, such as "Info:," which may launch a freeform text box for answering, and "Unknown."

After information about the suspect's location has been obtained, the active assailant protocol 126 may present 536 a preprogrammed inquiry, "Obtain the suspect's description." Possible response options may include "Info:," which may launch a diagnostic tool for obtaining a description of the suspect, and "Unknown." The diagnostic tool for obtaining the description of the suspect may include a plurality of inquiries and response fields for additional descriptive details about the suspect. In some embodiments, the suspect's description may be obtained before the suspect's location, or the preprogrammed inquiries may be arranged in a different order.

The dispatcher may be presented 538 a preprogrammed inquiry, "Can you safely evacuate/leave the building/area?" The active assailant protocol 126 may present preprogrammed responses, such as "Yes," "No," and "Unknown." The response may determine which set of pre-arrival instructions should be given to the caller. If the caller answers "Yes," the dispatcher may be presented 539 with evacuation instructions to provide to the caller. If the caller answers "No" or "Unknown," the dispatcher may be presented 540 with lockdown to provide to the caller. Evacuation and lockdown instructions are described in more detail below with reference to FIGS. 6B-6C. Because phone contact may be lost, it may be beneficial to give the pre-arrival instructions early to prepare the caller to escape, hide, and/or defend themselves. In some embodiments, the pre-arrival instructions may be provided before the aforementioned inquiries are asked, and/or the dispatcher may be able to skip to the pre-arrival instructions before completing all of the previous inquiries. The pre-arrival instructions may be configured to remove potential victims from the immediate area and/or plain sight. The dispatcher may be able to return to the key questions after the caller has completed the pre-arrival instructions and/or called back.

If the caller answers "No" or "Unknown" to preprogrammed inquiry 538, the dispatcher may be presented 541 with a follow-up preprogrammed inquiry, "Where exactly are you?" Preprogrammed responses may include "Info:," which may launch a freeform text box for answering, and "Unknown." The dispatcher may also be presented 542 with a follow-up preprogrammed inquiry, "What's the best way to get to you?"Possible response options may include "Info:," which may launch a freeform text box for answering, and "Unknown." The dispatcher may be presented 543 with another follow-up preprogrammed inquiry, "How many people are with you?" Preprogrammed responses may include "Info:," which may launch a freeform text box for answering, "Unknown," and "None."

The dispatcher may be presented 544 with a preprogrammed inquiry, "How many people are in the building/area?" Possible response options may include "Info:," which may launch a freeform text box for answering, and "Unknown." The active assailant protocol 126 may present 546 a preprogrammed inquiry, "Does the suspect appear to be wearing a bulletproof vest or body armor?" The dispatcher may be presented by preprogrammed responses, such as "Yes," "No," and "Unknown." The presence of body armor on the suspect may limit the effectiveness of responders' weapons and may indicate that the assailant has a higher level of preparation and skill.

The dispatcher may be presented 548 with a preprogrammed inquiry, "Did you see the suspect carrying anything. Preprogrammed responses may include "Yes," "No," and "Unknown." If the caller answers "Yes," the dispatcher may be presented 549 the preprogrammed inquiry, "Describe it to me." with a possible response of "Info:," which may launch a freeform text box for answering. If the suspect is carrying a backpack, duffle bag, ammunition can, or the like, it may indicate the suspect has explosives, chemical or biological weapons, extra ammunition, or other weapons that will hinder a law enforcement response.

The active assailant protocol 126 may present 550 the dispatcher with a preprogrammed inquiry, "Did you hear the suspect saying anything?" Possible preprogrammed responses may include "Yes," "No," and "Unknown." If the caller answers "Yes," the dispatcher may be presented 551 the preprogrammed inquiry, "What did s/he say?" The response may provide insight into the suspect's motives, level of preparation, and intended target(s). For example, the suspect might have shouted the name of a person who is a specific target, and police officers may focus their response based on the target's likely location. Religious, racial, or political statements may be made by a suspect affiliated with a racist or terrorist group, which may indicate a higher level of training and/or access to weapons and/or explosives not usually encountered by police responders.

The active assailant protocol 126 may determine 552 whether the caller previously indicated the suspect has left the area, was leaving the area, or was circulating the area and/or if vehicle information was previously provided. If the caller did not indicate the suspect had left, was leaving, or was circulating, the dispatcher may be presented 553 with a preprogrammed inquiry, "Did s/he arrive in a vehicle?" Possible preprogrammed responses may include "Yes-vehicle," "Yes-boat," "No," and "Unknown." If the caller responds "Yes-vehicle" or "Yes-boat," the active assailant protocol may present 554 a preprogrammed inquiry, "Obtain the vehicle description." and preprogrammed responses of "Info:," which may launch a diagnostic tool for obtaining a description of the vehicle, and "Unknown." In addition, the active assailant protocol may present 555 a preprogrammed inquiry, "Where's the vehicle now?" Preprogrammed responses may include "Info:," which may launch a freeform text box for answering, and "Unknown."

The dispatcher may be presented 556 with a preprogrammed inquiry, "Has the suspect taken any hostages?" The dispatcher may be presented with preprogrammed responses, such as "Yes," "No," and "Unknown." If the caller answers "Yes," the dispatcher may be presented 557 with a preprogrammed inquiry, "How many?" The active assailant protocol 126 may present possible responses, such as "One," "More than one (enter number):," which may launch a freeform text box for inputting an exact number, and "Unknown." The dispatcher may also be presented with a preprogrammed inquiry 558 "Exactly where are they?" Preprogrammed responses may include "Info:," which may launch a freeform text box for answering, and "Unknown."

The active assailant protocol 126 may present 560 the dispatcher with a preprogrammed inquiry, "How many people are injured?" The active assailant protocol 126 may present possible responses, such as "One," "More than one (enter number):," which may launch a freeform text box for inputting an exact number, and "Unknown." Before ending, the active assailant protocol 126 may present 562 a preprogrammed inquiry, "Is there anything else you can tell me?" Possible responses may include "Yes (info):," which may launch a freeform text box for recording additional details, and "No." The active assailant protocol 126 may end, provide post-dispatch instructions, and/or provide dispatch life support after all questions have been answered.

As can be appreciated, some or all of the information gathered by the pre-scripted interrogation of the active assailant protocol 126 may not be used, for example, in calculating a determinant value. Similarly, some or all the information may not be communicated to the emergency responder law enforcement officers. However, the information gathered may be used, or stored for later use, by law enforcement and/or emergency dispatch services, for example, to review the response and/or identify ways to improve the response.

As can also be appreciated, the spelling and/or sentence structure of the preprogrammed inquiries may vary according to the geographic location or region where the emergency police dispatch system and/or active assailant protocol 126 may be deployed.

FIGS. 6A-6E are a user interface 300 of an emergency police dispatch system at various points as the emergency police dispatch system presents a pre-scripted interrogation, traversing one path of a logic tree of the active assailant protocol 126, according to one embodiment. As previously explained above, with reference to FIG. 3, the emergency police dispatch system user interface 300 allows a dispatcher to interface with the emergency police dispatch protocol. In particular, in the illustrated embodiment, the user interface 300 is facilitating traversal of the active assailant protocol 126.

The user interface 300 presents one or more tabs 310, including a tab 310b (e.g., a key questions or "KQ" tab) that is configured to present preprogrammed inquiries (e.g., key questions) as part of a pre-scripted interrogation of a dispatch protocol. The particular questions presented may depend on the dispatch protocol, in this case the active assailant protocol 126, and the path along a logic tree of the dispatch protocol that may be traversed based on caller responses to the preprogrammed inquiries, as explained above with reference to FIG. 5. Typically, but not always, the user interface 300 will present a tab 310b (e.g. a Key Questions or "KQ" tab) upon completion of the case entry protocol on tab 310a (i.e., the "Entry" tab"). If sufficient information is available to identify a chief complaint, the emergency police dispatch protocol may shunt to an appropriate dispatch protocol. In this case, the emergency police dispatch protocol has shunted to the active assailant protocol 126, presented tab 310b, initialized the active assailant protocol 126, and traversed the active assailant protocol 126.

Figure 6A:
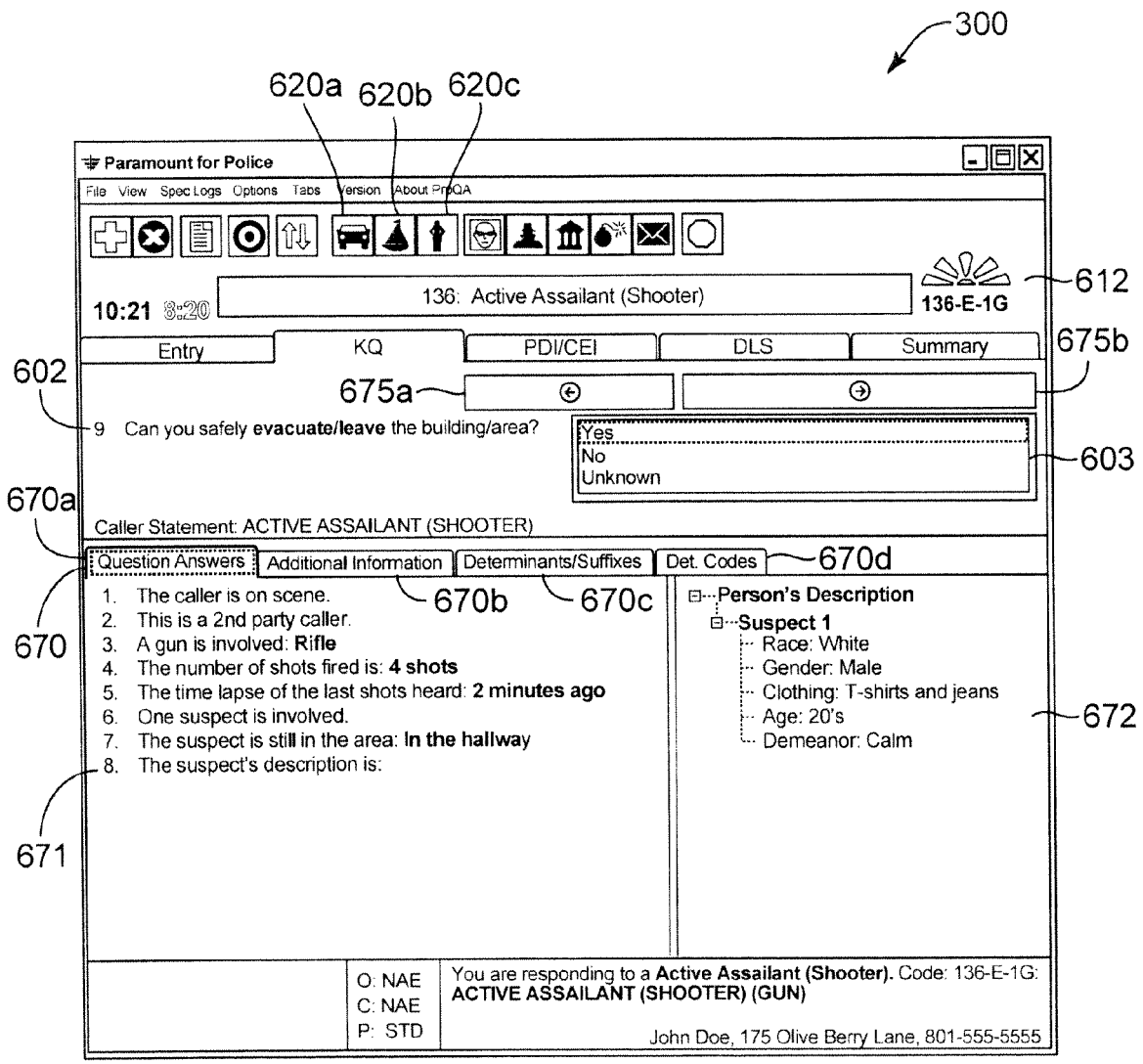

FIG. 6A illustrates the user interface 300 presenting a preprogrammed inquiry 602 "Can you safely evacuate/leave the building/area?" for the dispatcher to relay to the caller. An input field 603 enables the dispatcher to quickly and easily enter input indicative of the caller's response to the preprogrammed inquiry 602. In the illustrated embodiment, the input field 603 provided is a list box presenting a list of acceptable inputs. As will be appreciated, the input field 603 may be any of a number of appropriate input field types, including but not limited to text fields, text boxes, menus, drop down menus, drop-down selection boxes, lists, buttons, check boxes, and radio buttons. In FIG. 6A, the list of acceptable inputs may include "Yes," "No," and "Unknown." In FIG. 6A, the input "Yes," is presently selected.

The user interface 300 may present navigation buttons 675a, 675b to enable the dispatcher to indicate to the user interface to navigate back or forward, respectively, in the emergency dispatch protocol. The dispatcher can select the forward navigation button 675b to indicate to the user interface 300 that the dispatcher is ready to proceed in the protocol. The dispatcher can select the back navigation button 675a to go back in the protocol. Accordingly, when the dispatcher selects the forward navigation button 675b, the protocol advances and the user interface 300 may present a next instruction and/or preprogrammed inquiry.

The user interface 300 may also present one or more diagnostic tool launch inputs 620a-c. As will be appreciated by a person of ordinary skill, other diagnostic tools may be included and/or the diagnostic tool launch inputs 620a-c may comprise a component other than a button, including familiar user interface components such as a drop down menu, a drop down selection box, a list, a check box, and a radio button. The diagnostic tool launch inputs 620a-c may enable the dispatcher to launch a particular diagnostic tool. Although the emergency police dispatch protocol may automatically initiate a diagnostic tool based on dispatcher-entered input indicative of one or more responses of the caller, the diagnostic tool launch inputs 620a-c provide a way for the dispatcher to manually (i.e., anytime, at the dispatcher's discretion) initiate a diagnostic tool. The diagnostic tool launch inputs 620a-c may include a vehicle description launch input 620a to receive descriptions of one or more vehicles, a boat (vessel) description launch input 620b to receive descriptions of one or more boats, and a person description launch input 620c to receive descriptions of one or more people. The illustrated diagnostic tool launch inputs 620a-c comprises buttons on the emergency police dispatch system user interface 300. The buttons may include, for example, icons or symbols, such as a car, a boat, or a person, as shown, so that the functions of the buttons are easily identifiable.

The user interface 300 may also present an answers pane 671 to display input received in relation to previous instructions and/or preprogrammed inquiries. For example, the answers pane 671 of FIG. 6A displays the dispatcher-entered input provided for multiple previously presented preprogrammed inquiries and/or instructions presented by the active assailant protocol 126; e.g., "1. The caller is on scene. 2. The caller is a second party caller . . . 8. The suspect's description is:." The answers pane 671 enables a dispatcher to quickly review previous responses for accuracy and to thereby improve understanding of the situation and/or incident reported by the caller. If the dispatcher were to inadvertently select an incorrect input in the input field 603, the dispatcher can readily recognize the error in the answers pane 671 and navigate back in the protocol by selecting the back navigation button 675a and then select a correct input. A description pane 672 may include descriptions of vehicles and/or people provided to one or more diagnostic tools. The dispatcher may be able to quickly review the descriptions for accuracy and/or to determine what descriptive information has already been provided by the caller. A dispatcher may use the diagnostic tool launch inputs 620a-c to easily launch the diagnostic tools and add, remove, and/or modify descriptions.

A plurality of tabs 670 may allow the dispatcher to switch between a "Question Answers" pane 670a and other panes. Other panes may provide additional information relating to processing a given emergency call, including an "Additional Information" pane 670b, which may provide axioms and rules for active assailant events and description essentials for answering questions, a "Determinant/Suffixes" pane 670c, which may include information about determinants and suffixes, and a "Determinant Codes" pane 670d, which may include information about determinant codes. The current determinant value 612 may be displayed to allow the dispatcher to determine the determinant value quickly, which may aid in determining if the determinant value should be changed.

FIG. 6B illustrates the user interface 300 presenting evacuation instructions. The evacuation instructions may be presented on an evacuation instructions pane 630a of a dispatching life support or "DLS" tab 310d. The evacuation instructions may be intended to help the caller evacuate the area as safely and as efficiently as possible. They may be designed to prevent potentially panicked callers from making the situation worse for themselves and/or responders. The evacuation instruction may include common sense advice that might not be apparent to a panicked caller without a clear reminder from a dispatcher, such as "Take an evacuation path that's away from the suspect." Callers may also desire to remove as many victims from the location as possible including wounded people, but removing wounded people can slow the evacuation, put the caller and/or others at risk, an/or cause additional injury to the wounded people. Accordingly, the instructions may include, "Do not attempt to move wounded people." Panicked callers may swarm responders and/or may appear to be a threat if they rush police officers. Swarming can endanger the callers and/or police officers by putting them in the line of fire and may hinder the ability of responders to appropriately assess and address possible threats. To prevent these problems, the instructions may include, "Do not rush towards officers, keep your hands visible at all times, and follow all of their commands." The evacuation instructions may include a preprogrammed inquiry 604, "Can you take the phone with you?" Buttons 605a, 605b containing possible responses may be selected by the dispatcher. If the caller can take the phone, the protocol may return to the "KQ" tab 310b. Otherwise, disconnect instructions may be provided and/or the case may be closed.

Figure 6C:
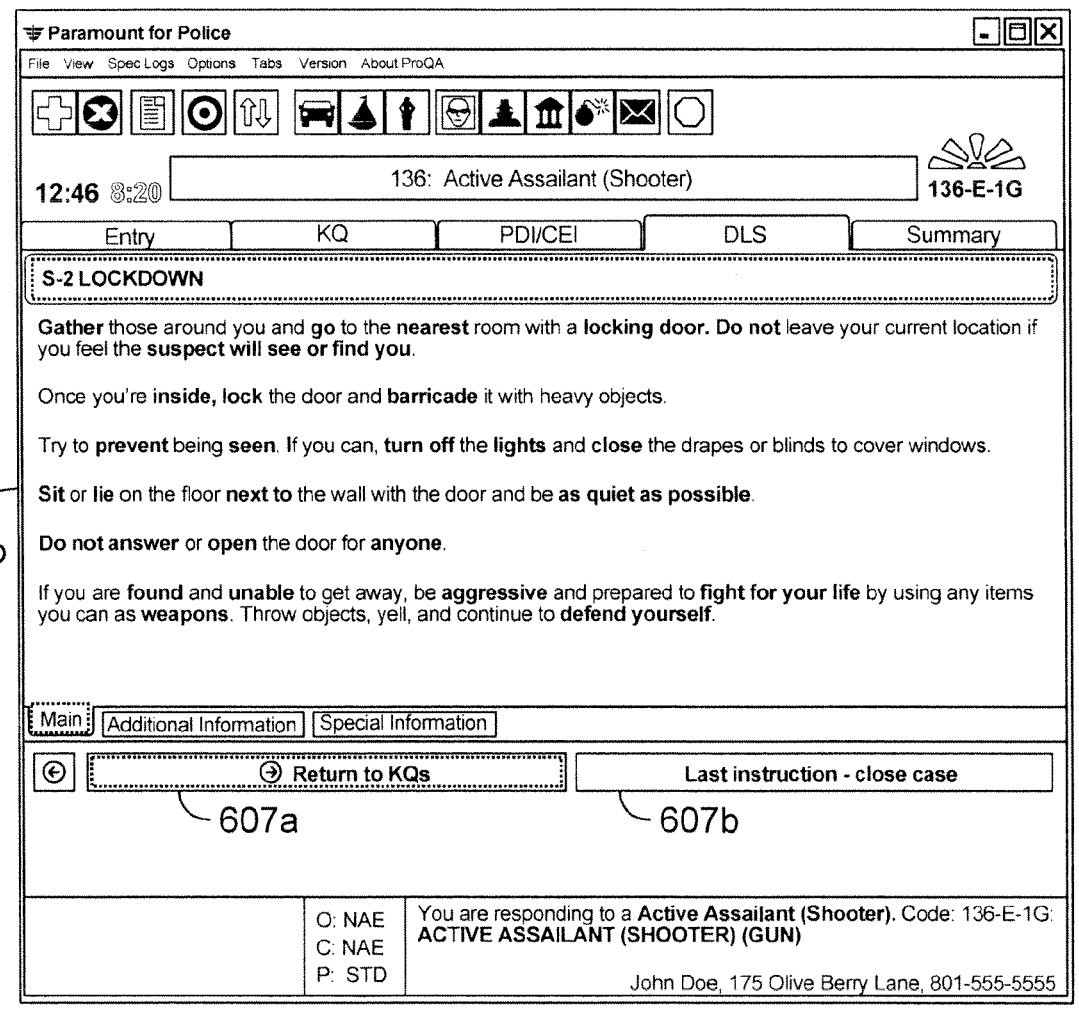

FIG. 6C illustrates the user interface 300 presenting lockdown instructions. The lockdown instructions may be provided on a lockdown instructions pane 630b. Lockdown may be the next best option for callers unable to evacuate to remove themselves from plain sight and secure themselves in an area that is more difficult for an assailant to target. A room with a locking door and/or a door that can be barricaded may remove potential victims from plain sight and keep the assailant(s) in the hallways and common areas where they can be easily located by responders. Accordingly, the lockdown instructions may include, "Gather those around you and go to the nearest room with a locking door." To minimize the danger of being hit by bullets fired through the door, the lockdown instructions may also include, "Sit or lie on the floor next to the wall with the door." It may also be important to prepare callers for the fact that they may need to fight for their life. A lockdown instruction, such as "If you are found and unable to get away, be aggressive and prepare to fight for your life by using any items you can as weapons," may suggest actions that callers can take if they are found and/or help put callers in an action mindset rather than a victim mindset. The lockdown instructions may include a button 607a to return to the "KQ" tab 310b and a button 607b to close the case, which may be used if the caller cannot take the phone and/or if heavy call volume requires the dispatcher to answer another call.

Figure 6D:
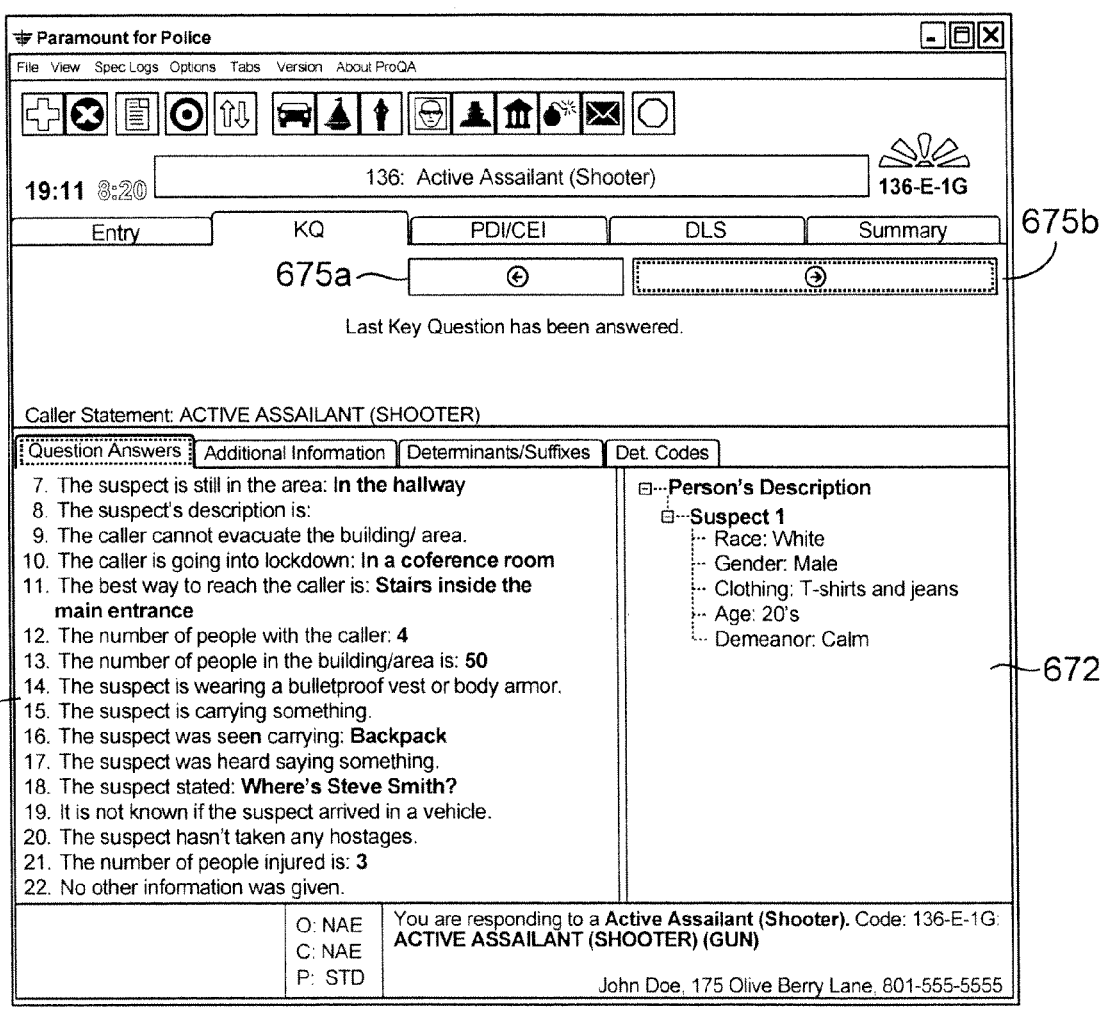

FIG. 6D illustrates the user interface 300 presenting the answer pane 671 once all questions have been answered. As before, the answer pane 671 may display previously entered input including, "9. The caller cannot evacuate the building/area."Accordingly, the dispatcher selected the input "No" or "Unknown" in input field 603 (FIG. 6A) in response to preprogrammed inquiry 602 (FIG. 6A). The dispatcher can select the navigation button 675b to indicate to the user interface 300 that the dispatcher is ready to proceed. The dispatcher can select navigation button 675a to go back in the protocol and/or modify answers to previous questions. The user interface 300 may also present the description pane 672 with any and/or all descriptions provided by the caller. The dispatcher may be able to update the descriptions or add new descriptions by selecting one of the diagnostic tool launch inputs 620a-c.

Figure 6E:
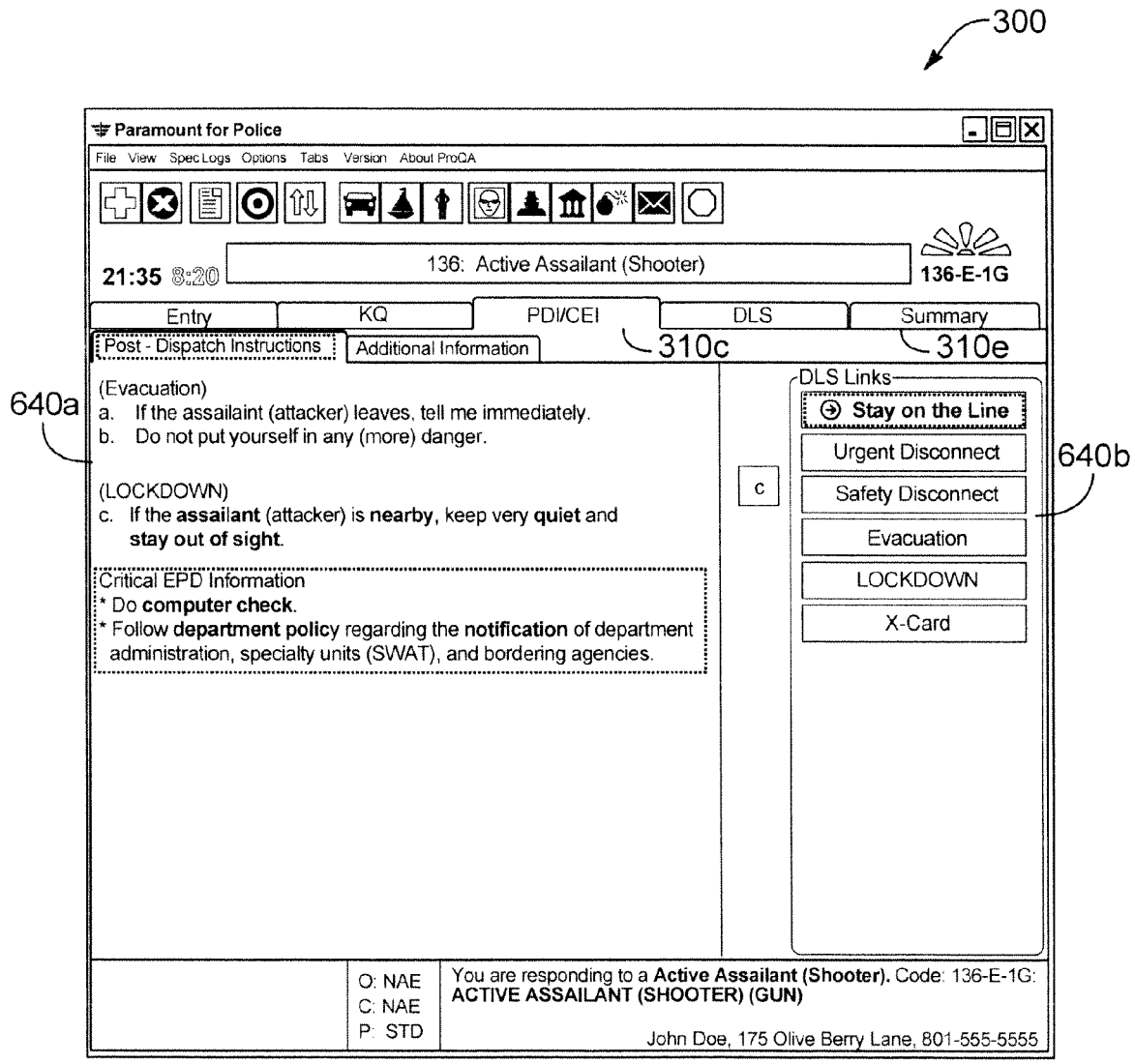

FIG. 6E illustrates the user interface 300 presenting post-dispatch instructions to the dispatcher. The post-dispatch instructions may be displayed on a post-dispatch instructions and/or critical EMD information tab (e.g., a "PDI/CEI" tab 310c). The "PDI/CEI" tab 310c may include a post-dispatch instructions pane 640a. The post-dispatch instructions pane 640a may include instructions for both evacuation and lockdown scenarios. However, the instructions for the scenario not applicable to the caller may be gray to deemphasize them. The "PDI/CEI" tab 310c may also include a DLS Links panel 640b with buttons to jump to dispatching life support instructions for a variety of scenarios, such as "Stay on the Line," "Urgent Disconnect," "Safety Disconnect," "Evacuation," "Lockdown," "Routine Disconnect," and the like. The dispatcher may also be able to select a "Summary" tab 310e to review a summary of the case. In some embodiments, the dispatcher may be able to view the summary at any time during the call.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A computer-implemented method to guide a dispatcher when communicating vocally with a caller via a communication device regarding an incident involving an active assailant and for dispatching an emergency dispatch response to the incident, the computer-implemented method comprising:
   presenting, on a dispatch center computer device, a pre-scripted interrogation comprising a plurality of preprogrammed inquiries for the dispatcher to ask the caller in order to systematically obtain a description of the incident involving the active assailant, wherein the description of the incident comprises caller responses to the plurality of preprogrammed inquiries, and wherein the preprogrammed inquiries of the pre-scripted interrogation include
   asking what happened,
   asking what type of weapons are involved,
   asking whether the caller can safely evacuate/leave the building/area;
   receiving, on the dispatch center computer device, dispatcher-entered input representative of caller responses to the preprogrammed inquiries of the pre-scripted interrogation;
   determining automatically on the dispatch center computer device a determinant value from one of a plurality of pre-established determinant values based on dispatcher-entered input representative of caller responses to one or more of the preprogrammed inquires; and
   generating an emergency dispatch response by emergency responders based on the determinant value.

2. The computer-implemented method of claim 1, wherein presenting a pre-scripted interrogation further comprises the dispatch center computer device traversing a path of a logic tree as the pre-scripted interrogation progresses, the logic tree configured to determine the preprogrammed inquiries to present as part of the pre-scripted interrogation based on caller responses to the preprogrammed inquiries.

3. The computer-implemented method of claim 1, further comprising providing preprogrammed inquiries to the dispatcher via a user interface on an output device of the dispatch center computer device.

4. The computer-implemented method of claim 1, further comprising providing preprogrammed inquiries to the dispatcher on a medium readable by the dispatcher.

5. The computer-implemented method of claim 1, wherein determining a determinant value includes determining whether a response to the preprogrammed inquiry asking what happened indicates an active assailant event.

6. The computer-implemented method of claim 1, wherein the preprogrammed inquiries of the pre-scripted interrogation include requesting a description of a suspect.

7. The computer-implemented method of claim 6, wherein the preprogrammed inquiries of the pre-scripted interrogation include requesting a description of a vehicle of the suspect.

8. The computer-implemented method of claim 1, further comprising providing evacuation instructions in response to receiving an indication that the caller can evacuate/leave the building/area.

9. The computer-implemented method of claim 1, further comprising providing lockdown instructions in response to receiving an indication that the caller cannot evacuate/leave the building/area.

10. The computer-implemented method of claim 1, further comprising updating automatically on the dispatch center computer device the determinant value based on a response to the preprogrammed inquiry asking what type of weapons are involved.

11. The computer system of claim 10, wherein said preprogrammed inquiries of the pre-scripted interrogation are according to a path along the logic tree that is traversed based on responses to the preprogrammed inquiries.

12. The computer system of claim 10, the memory further comprising a user interface that is displayed on the output device and configured to facilitate presentation of preprogrammed inquiries and to facilitate receiving dispatcher-entered input.

13. The computer system of claim 10, wherein the protocol is configured to determine the determinant value by determining whether a response to the preprogrammed inquiry asking what happened indicates an incident involving an active assailant.

14. The computer system of claim 10, wherein the preprogrammed inquiries of the pre-scripted interrogation include requesting a description of a suspect.

15. The computer system of claim 14, wherein the preprogrammed inquiries of the pre-scripted interrogation include requesting a description of a vehicle of the suspect.

16. The computer system of claim 10, wherein the protocol is configured to provide evacuation instructions in response to receiving an indication that the caller can evacuate/leave the building/area.

17. The computer system of claim 10, wherein the protocol is configured to provide lockdown instructions in response to receiving an indication that the caller cannot evacuate/leave the building/area.

18. The computer system of claim 10, wherein the protocol is configured to update automatically on the dispatch center computer device the determinant value based on a response to the preprogrammed inquiry asking what type of weapons are involved.

19. A computer system to guide a dispatcher when communicating with a caller vocally via a communication device regarding an incident involving an active assailant and for dispatching an emergency response to the incident, the computer system comprising:
- a processor;
- an output device in communication with the processor;
- an input device in communication with the processor;
- a memory in communication with the processor, the memory comprising:
  - a protocol comprising a logic tree that is configured to determine one of a plurality of pre-established determinant values, the protocol configured to
    - present on the output device a pre-scripted interrogation comprising a plurality of preprogrammed inquiries for the dispatcher to ask the caller in order to systematically obtain a description of the incident involving the active assailant, wherein the description of the incident comprises caller responses to the plurality of preprogrammed inquiries, and wherein the preprogrammed inquiries of the pre-scripted interrogation include
      - asking what happened,
      - asking what type of weapons are involved,
      - asking whether the caller can safely evacuate/leave the building/area;
    - receive, via the input device, dispatcher-entered input corresponding to caller responses to the preprogrammed inquiries of the pre-scripted interrogation, and
    - determine automatically on the dispatch center computer device a determinant value from one of a plurality of pre-established determinant values based on dispatcher-entered input representative of caller responses to one or more of the preprogrammed inquires, wherein the determinant value specifies an appropriate emergency dispatch response.

20. A non-transitory computer-readable storage medium having stored thereon computer-readable instruction code for a dispatch center computer to perform a method to assist a dispatcher when communicating vocally with a caller via a communication device regarding an incident involving an active assailant, the method comprising:
- presenting on a dispatch center computer device a pre-scripted interrogation comprising a plurality of preprogrammed inquiries for the dispatcher to ask the caller to systematically obtain a description of the incident, the description of the incident comprising caller responses to the plurality of preprogrammed inquiries, wherein the dispatch center computer device includes a logic tree configured to determine the preprogrammed inquiries of the pre-scripted interrogation and automatically determine one of a plurality of pre-established determinant values based on dispatcher-entered input representative of caller responses to one or more of the preprogrammed inquires, and wherein the plurality of preprogrammed inquiries of the pre-scripted interrogation include
  - asking what happened,
  - asking what type of weapons are involved,
  - asking whether the caller can safely evacuate/leave the building/area;
- receiving dispatcher-entered input on the dispatch center computer device representative of caller responses to the preprogrammed inquiries of the pre-scripted interrogation;
- assigning on the dispatch center computer device the pre-established determinant value determined by the logic tree and the pre-scripted interrogation; and
- generating an emergency dispatch response based on the assigned pre-established determinant value.

* * * * *

UNITED STATES PATENT AND TRADEMARK OFFICE
CERTIFICATE OF CORRECTION

| | |
|---|---|
| PATENT NO. | : 8,873,719 B2 |
| APPLICATION NO. | : 13/755793 |
| DATED | : October 28, 2014 |
| INVENTOR(S) | : Jeffrey J. Clawson |

Page 1 of 1

It is certified that error appears in the above-identified patent and that said Letters Patent is hereby corrected as shown below:

In the claims, Claim 19 should be claim 11.

Column 20, Claim 11, line 40, claim 11 should be claim 12; and the reference to claim '10' should be to claim '11'.

Column 20, Claim 12, line 44, claim 12 should be claim 13; and the reference to claim '10' should be to claim '11'.

Column 20, Claim 13, line 49, claim 13 should be claim 14; and the reference to claim '10' should be to claim '11'.

Column 20, Claim 14, line 54, claim 14 should be claim 15; and the reference to claim '10' should be to claim '11'.

Column 20, Claim 15, line 57, claim 15 should be claim 16; and the reference to claim '14' should be to claim '15'.

Column 20, Claim 16, line 60, claim 16 should be claim 17; and the reference to claim '10' should be to claim '11'.

Column 20, Claim 17, line 64, claim 17 should be claim 18; and the reference to claim '10' should be to claim '11'.

Column 21, Claim 18, line 1, claim 18 should be claim 19; and the reference to claim '10' should be to claim '11'.

Signed and Sealed this
Eighth Day of December, 2015

Michelle K. Lee
*Director of the United States Patent and Trademark Office*